(12) United States Patent
Agee

(10) Patent No.: US 12,732,407 B2
(45) Date of Patent: Sep. 8, 2026

(54) RESILIENT MACHINE-TO-MACHINE NETWORKS

(71) Applicant: Brian G. Agee, San Jose, CA (US)

(72) Inventor: Brian G. Agee, San Jose, CA (US)

( * ) Notice: Subject to any disclaimer, the term of this patent is extended or adjusted under 35 U.S.C. 154(b) by 279 days.

(21) Appl. No.: 18/287,615

(22) PCT Filed: Apr. 20, 2022

(86) PCT No.: PCT/US2022/025574
§ 371 (c)(1),
(2) Date: Oct. 19, 2023

(87) PCT Pub. No.: WO2022/226084
PCT Pub. Date: Oct. 27, 2022

(65) Prior Publication Data

US 2024/0187296 A1 Jun. 6, 2024

Related U.S. Application Data

(60) Provisional application No. 63/177,379, filed on Apr. 20, 2021.

(51) Int. Cl.
*H04L 27/26* (2006.01)
*H04J 13/00* (2011.01)
*H04L 5/00* (2006.01)

(52) U.S. Cl.
CPC .... *H04L 27/26524* (2021.01); *H04J 13/0048* (2013.01); *H04L 5/0021* (2013.01); *H04L 27/2634* (2013.01)

(58) Field of Classification Search
CPC ........ H04B 1/69; H04B 1/709; H04B 1/7093; H04B 1/7163; H04B 1/7137;
(Continued)

(56) References Cited

U.S. PATENT DOCUMENTS 5,260,968 A 11/1993 Gardner et al.
5,343,496 A 8/1994 Honig et al.
(Continued)

FOREIGN PATENT DOCUMENTS

GB 2491835 12/2012
GB 2491836 12/2012
(Continued)

OTHER PUBLICATIONS

Agarwal, et. al., Optimal Bandwidth Allocation to Coding and Spreading in DS-CDMA Systems Using LMMSE Front-End Detector, IEEE Trans. Wireless Comms., vol. 4, No. 6, Nov. 2005, pp. 2636-2641.
(Continued)

*Primary Examiner* — Young T. Tse
(74) *Attorney, Agent, or Firm* — Steven J Shattil

(57) ABSTRACT

A transmitter spreads a data signal with an inner spreading code to produce a first spread signal; modulates a link mask onto the first spread signal to produce a masked signal; spreads the masked signal with an outer spreading code to produce a second spread signal; and modulates the second spread signal onto a multitone transmission signal. The link mask can include at least one of a destination mask and a source mask. A network mask might be modulated onto the second spread signal to conceal cyclic features in a spreading format used to spread the data signal and/or the first masked signal. A receiver demodulates a received multitone transmission to produce at least one demodulated signal; demasks the at least one demodulated signal to produce at least one demasked signal; and despreads the at least one demasked signal using an adaptation algorithm to remove the outer spreading code.

18 Claims, 20 Drawing Sheets

(58) Field of Classification Search
CPC ............... H04L 5/0021; H04L 27/2634; H04L 27/26524; H04J 13/0048
USPC ............... 375/147, 148, 150, 152, 260, 267; 370/334, 335, 342
See application file for complete search history.

(56) References Cited

U.S. PATENT DOCUMENTS 5,692,006 A 11/1997 Ross
5,848,105 A 12/1998 Gardner et al.
6,128,276 A 10/2000 Agee
6,175,587 B1 1/2001 Madhow et al.
6,175,588 B1 1/2001 Visotsky et al.
6,370,134 B1 4/2002 Aramaki
6,426,973 B1 7/2002 Madhow et al.
6,616,035 B2 9/2003 Ehrensvard et al.
6,621,851 B1 9/2003 Agee et al.
6,658,047 B1 12/2003 Komulainen et al.
6,771,690 B2 8/2004 Heikkila
6,975,666 B2 12/2005 Affes et al.
7,050,490 B2 5/2006 Chi et al.
7,079,480 B2 7/2006 Agee
7,099,372 B2 8/2006 Niecyporowicz et al.
7,126,982 B1 10/2006 Barham et al.
7,130,333 B2 10/2006 Gibson, Jr. et al.
7,161,927 B2 1/2007 Wu et al.
7,248,841 B2 7/2007 Agee et al.
7,301,985 B1 11/2007 Hall et al.
7,313,164 B1 12/2007 Wilson et al.
7,321,564 B2 1/2008 Ikram et al.
7,336,930 B2 2/2008 Larsson et al.
7,443,909 B2 10/2008 Nguyen et al.
7,453,855 B1 11/2008 Madhow
7,483,480 B2 1/2009 Guo et al.
7,492,815 B2 2/2009 Guo et al.
7,539,239 B2 5/2009 Barham
7,701,999 B1 4/2010 Schlegel et al.
7,706,477 B2 4/2010 Larsson
7,764,747 B2 7/2010 Ionescu
7,876,845 B2 1/2011 Karabinis
7,978,747 B1 7/2011 Harris et al.
8,036,255 B1 10/2011 Harris et al.
8,036,601 B2 10/2011 Prasad et al.
8,050,337 B2 11/2011 Karabinis
8,059,610 B2 11/2011 Li et al.
8,130,693 B2 3/2012 Miller et al.
8,144,668 B1 3/2012 Madhow
8,290,074 B2 10/2012 Annavajjala et al.
8,345,693 B1 1/2013 Kim
8,345,733 B2 1/2013 Ghosh
8,358,613 B1 1/2013 Giallorenzi et al.
8,412,129 B2 4/2013 Himayat et al.
8,666,368 B2 3/2014 Schell et al.
8,670,493 B2 3/2014 Karabinis
8,806,586 B2 8/2014 Ehrensvard et al.
8,811,502 B2 8/2014 Karabinis
8,943,580 B2 1/2015 Fadell et al.
9,122,860 B2 9/2015 Ehrensvard et al.
10,812,955 B2 10/2020 Agee
2002/0150109 A1 10/2002 Agee
2006/0281476 A1 12/2006 Lane et al.
2006/0285481 A1 12/2006 Lane et al.
2008/0194211 A1 8/2008 Suehiro
2008/0291972 A1 11/2008 Chin Po Shin et al.
2009/0201902 A1* 8/2009 Miki ..................... H04W 88/08 370/342
2009/0232234 A1* 9/2009 Du ....................... H04B 7/2621 375/260
2010/0182989 A1 7/2010 Ramesh et al.
2010/0309857 A1* 12/2010 Kawamura ........... H04L 1/1671 370/329
2011/0134841 A1 6/2011 Shaheen
2011/0306318 A1 12/2011 Rodgers et al.
2012/0230178 A1 9/2012 Wang et al.
2012/0231828 A1 9/2012 Wang et al.
2014/0056221 A1 2/2014 Lt et al.
2015/0271004 A1 9/2015 Agee
2016/0254889 A1 9/2016 Shattil
2017/0163296 A1* 6/2017 Terry ....................... H04B 1/69
2017/0250772 A1 8/2017 Zhang et al.
2019/0036746 A1 1/2019 Hwang et al.
2019/0158998 A1 5/2019 Agee
2019/0320303 A1 10/2019 Agee

FOREIGN PATENT DOCUMENTS

GB 2491840 12/2012
WO 2012171867 12/2012

OTHER PUBLICATIONS

Agee, The Property-Restoral Approach to Blind Adaptive Signal Extraction, Ph.D. Dissertation, Jun. 1989, Davis, CA.

Agee, et. al., Spectral Self-Coherence Restoral: A New Approach to Blind Adaptive Signal Extraction Using Antenna Arrays, Proc. IEEE, vol. 78, No. 4, Apr. 1990, pp. 753-767.

Agee, Maximum-Likelihood Approaches to Blind Adaptive Signal Extraction Using Narrowband Antenna Arrays, in Proc. Twenty-Fifth Asilomar Conference on Signals, Systems and Computers, Nov. 1991.

Comaniciu, et. al., Jointly Optimal Power and Admission Control for Delay Sensitive Traffic in CDMA Networks With LMMSE Receivers, IEEE Trans. Signal Processing, vol. 51, No. 8, Aug. 2003, pp. 2031-2042.

Comaniciu, et. al., Capacity Regions and Optimal Power Allocation for Groupwise Multiuser Detection, IEEE Trans. Wireless Comms., vol. 4, No. 2, Mar. 2005, pp. 349-352.

Etkin, et. al., Degrees of Freedom in Underspread MIMO Fading Channels, in Proc. ISIT 2003, Jun. 2003, p. 323, Yokohama, Japan.

Evans, et. al., Large System Performance of Linear Multiuser Receivers in Multipath Fading Channels, IEEE Trans. Info. Theory, vol. 46, No. 6, Sep. 2000, pp. 2059-2078.

Kammoun, et. al., A Central Limit Theorem for the SINR at the LMMSE Estimator Output for Large-Dimensional Signals, IEEE Trans. Info. Theory, vol. 55, No. 11, Sep. 2006, pp. 5048-5063.

Kempter, et. al., Capacity and QoS Analysis For A Novel Packet Based Wireless Access System, in Proc. 2003 IEEE 58th Vehicular Tech., Conf.,, Oct. 2003, pp. 1432-1436, Orlando, FL.

Mirbagheri, et. al., A linear MMSE Receiver for Multipath Asynchronous Random-CDMA With Chup Pulse Shaping, IEEE Trans. Vehicular Tech., vol. 51, No. 5, Sep. 2002, pp. 1072-1086.

Montanari, et. al., Analysis of Belief Propagation for Non-Linear Problems: The Example of CDMA (or: How to Prove Tanaka's Formula), in Proc. 2006 IEEE Info. Theory Workshop, Mar. 2006, pp. 160-164, Punta del Este, Uruguay.

Morrow, et. al., Packet Throughput in Slotted ALOHA DS/SSMA Radio Systems with Random Signature Sequences, IEEE Trans. Comms., vol. 40, No. 7, Jul. 1992, pp. 1223-1230.

Ng, et. al., On the Capacity of Cellular Networks with Global LMMSE Receiver, in Proc. 2007 IEEE Intl. Comms. Conf.,, Jun. 2007, pp. 870-876, Glasgow, UK.

Schizas, et. al., Consensus-Based Distributed Estimation of Random Signals with Wireless Sensor Networks, in Proc. 40th Asilomar Conf. Signals, Systems, and Comp., Oct. 2006, pp. 530-534, Pacific Grove, CA.

Schlegel, et. al., A Novel Random Wireless Packet Multiple Access Method Using CDMA, IEEE Trans. Wireless Comms., vol. 5, No. 6, Jun. 2006, pp. 1362-1370.

Shekhar, et. al., Closed Form Throughput of a Slotted ALOHA Network Using LMMSE Receiver, in Proc. 42st Asilomar Conf. Signals, Systems, and Comp., Nov. 2007, pp. 2128-2132, Pacific Grove, CA.

Shekhar, et. al., On the use of LMMSE Receiver for Single and Multiple Packet Reception in Stabilized Multi-channel Slotted ALOHA, in Proc. 2008 IEEE Radio and Wireless Symp., Jan. 2008, pp. 215-218, Orlando, FL.

(56) References Cited

OTHER PUBLICATIONS

Shi, et. al., On the Performance of Partitioned-Spreading CDMA with Multistage Demodulation, in Proc. 2006 40th Annual Conf. Info. Sciences and Systems, Mar. 2006, pp. 1522-1527, Princeton, NJ.
Tajer, et. al., Coordination Limits in MIMO Networks, in Proc. 2011 IEEE Intl. Symbp. on Info. Theory, Aug. 2011, pp. 933-937, St. Petersburg, Russia.
Tse, et. al., Linear Multiuser Receivers: Effective Interference, Effective Bandwidth and User Capacity, IEEE Trans., Info. Theory, vol. 45, No. 2, Mar. 1999, pp. 641-657.
Veeravalli, et. al., The Coding-Spreading Tradeoff in CDMA Systems, IEEE J. Selected Areas in Comms., vol. 20, No. 2, Feb. 2002, pp. 396-408.
Verdu, et. al., Spectral Efficiency of CDMA with Random Spreading, IEEE Trans. Info. Theory, vol. 45, No. 2, Mar. 1999, pp. 622-640.
Wang, et. al., Blind Multiuser Detection: A Subspace Approach, IEEE Trans. Info. Theory, vol. 44, No. 4, Mar. 1998, pp. 677-690.
Zaidel, et. al., Multicell Uplink Spectral Efficiency of Coded DS-CDMA With Random Signatures, IEEE J. Selected Areas in Comms., vol. 19, No. 8, Aug. 2001, pp. 1556-1569.
Webb, Understanding Weightless: Technology, Equipment, and Network Deployment for M2M Communications in White Space, Cambridge University Press, 2012.
A. Roessler, et al.; "LTE-Advanced (3GPP Rel.11) Technology Introduction"; Rohde&Schwarz, 7.2013-1MA232_1E.
"Part 11: Wireless LAN Medium Access Control (MAC) and Physical Layer (PHY) Specifications"; IEEE Std 802.11™-2012; IEEE Std 802.11-2007; IEEE, Mar. 29, 2012; ISBN 978-0-7381-7245-3 STDPD97218.
S.M. Sajjad, et al.; "Security Analysis of IEEE 802.15.4 MAC in the context of Internet of Things (IoT)"; 2014 Conf. on Information Assurance and Cyber Security (CIACS); Jun. 12-13, 2014.
"IEEE Std 802.15.4: IEEE Standard for Local and metropolitan area networks—Part 15.4: Low-Rate Wireless Personal Area Networks (LR-WPANs)"; IEEE, Sep. 5, 2011; ISBN 978-0-7381-6684-1 STDPD97126.
"IEEE Std 802.15.5: Part 15.5: Mesh Topology Capability in Wireless Personal Area Networks (WPANs)"; IEEE, May 8, 2009; ISBN 978-0-7381-5918-8 STDPD9591.
"IEEE Std 802.15.6: IEEE Standard for Local and metropolitan area networks Part 15.6: Wireless Body Area Networks"; IEEE, Feb. 29, 2012; ISBN 978-0-7381-7206-4 STD97213.
"IEEE Std 802.15.7: IEEE Standard for Local and metropolitan area networks—Part 15.7: Short-Range Wireless Optical Communication Using Visible Light"; IEEE, Sep. 6, 2011; ISBN 978-0-7381-6665-0 STD97117.
"IEEE Std 802.16: IEEE Standard for Local and metropolitan area networks Part 16: Air Interface for Broadband Wireless Access Systems"; IEEE May 29, 2009; ISBN 978-0-7381-5919-5 STD95914.
"Specification of the Bluetooth System"; Version 4.1, vol. 0; Dec. 3, 2013.
"ISO/IEC International Standard: Information technology—Telecommunications and information exchange between systems—Near Field Communication—Interface and Protocol (NFCIP-1)"; 2013, ISO/IEC 18092:2013(E).
ECMA International; "Standard ECMA-368: High Rate Ultra Wideband PHY and MAC Standard"; 3rd Edition / Dec. 2008.
B.G. Agee; "802.11 Overview"; May 14, 2008.
G.M. Dillard, et al.; "Cyclic Code Shift Keying: A Low Probability of Intercept Communication Technique"; IEEE Transactions on Aerospace and Electronic Systems (vol. 39 , Issue: 3 , Jul. 2003); pp. 786-798.
R. Kempter, et al.; "On coverage and routing in wireless ad hoc networks"; IEEE Signal Processing Magazine (vol. 23 , Issue: 5 , Sep. 2006); pp. 50-62.
K. Stamatiou, et al.; "Channel Diversity in Random Wireless Networks"; IEEE Transactions on Wireless Communications (vol. 9 , Issue: 7 , Jul. 2010); pp. 2280-2289.
B.G.Agee, et al.; "Aegis Program Summary"; Wireless @ Virginia Tech, Feb. 27, 2008.
J.H.Reed, et al.; "Project Aegis, Network Based Characterization and Management of Interference in 802.11 WLAN's"; Virginia Polytechnic Institute & State University, Apr. 1, 2004.
Y.Kim, et al.; "OFDMA Backoff Control Scheme for Improving Channel Efficiency in the Dynamic Network Environment of IEEE 802.11ax WLANs"; Sensors 2021, 21, 5111. https://doi.org/10.3390/s21155111, Jul. 28, 2021.
Z. Wu, et al.; "Comprehensive Study and Comparison on 5G NOMA Schemes"; IEEE Access, 10.1109/ACCESS.2018.2817221, Mar. 19, 2018.
K. Lu, et al.; "A survey of Non-Orthogonal Multiple Access for 5G"; IEEE Communications Surveys & Tutorials ( vol. 20, Issue: 3, thirdquarter 2018).
Y. Jin, et al.; "Interference mitigation study for Low Energy Critical Infrastructure Monitoring Applications"; 2012 International Symposium on Communications and Information Technologies (ISCIT), Oct. 2012.
F. Wunsch, et al.; "LPWAN Applications in the 2.4 GHz Band:A Viable Choice?"; 2018 IEEE 88th Vehicular Technology Conference (VTC-Fall), Aug. 2018.
M. Crussiere, et al.; "Adaptive Spread-Spectrum Multicarrier Multiple-Access Over Wirelines"; IEEE Journal on Selected Areas in Communications, V. 24, No. 7, Jul. 2006.
ISA/US, PCT International Search Report for PCT/US2022/025574, Aug. 24, 2022.
ISA/US, PCT Written Opinion for PCT/US2022/025574, Aug. 24, 2022.
K. Kim, let al., "Cyclostationary Approaches to Signal Detection and Classification in Cognitive Radio," 2007 2nd IEEE International Symposium on New Frontiers in Dynamic Spectrum Access Networks, Dublin, 2007, pp. 212-215.
Y. Lee, et al., "Cyclostationarity-Based Detection of Randomly Arriving or Departing Signals," Journal of Applied Research and Technology, vol. 12, Issue 6, 2014, pp. 1083-1091.
D. Allan, et al., "FPGA implementation of a cyclostationary detector for OFDM signals," 2016 24th European Signal Processing Conference (EUSIPCO), Budapest, 2016, pp. 647-651.
M. Barakat, et al., "FPGA Implementation of Cyclostationary Feature Detector for Cognitive Radio OFDM Signals," 2018 13th International Conference on Computer Engineering and Systems (ICCES), Cairo, Egypt, 2018, pp. 215-218.
Rowe et al., "A Broad-Spectrum Pseudorandom Gaussian Noise Generator," IEEE Transactions on Automatic Control, vol. AC-15, No. 5, 1970, pp. 529-535.
B. Agee, "Fast Acquisition of Burst and Transient Signals Using a Predictive Adaptive Beamformer," in Proc. 1989 IEEE Military Communications Conference, Oct. 1989.
B. Agee, "Blind Detection, Separation, and Location of Dense Co-Channel Emitters Using Multiplatform Spatial-Coherence Restoral," in Proc. 2006 IEEE Workshop on Sensor Array and Multichannel Processing, Jul. 2006.
B. Agee, et al., "Spectral Self-Coherence Restoral: A New Approach to Blind Adaptive Signal Extraction Using Antenna Arrays," IEEE Proceedings, vol. 78, No. 4, pp. 753-767, Apr. 1990.
E. Krzysiak, et al., "New Copy-Aided Techniques for Superresolution Direction Finding and Geolocation," in Proc. Fourth Southwest Institute Conference on Direction Finding, Nov. 1997.
L. Delaney, et al., Toward a Universal Radio Frequency System for Special Operations Forces, National Research Council, 2009, Washington, DC: The National Academies Press.
B. Agee, "Spatial Denial Strategies Using Multiantenna Transceiver Structures," in Proc. Low Probability of Intercept ELINT/SIGINT Conference, Naval Postgraduate School, Monterey, CA, Nov. 2009.
B. Agee, P. Kelly, "The Backtalk Communications Airlink," Q3 1996 meeting of the LPI Communications Committee, Oct. 1996.
Z. Ankarali, et al., "Cyclic Feature Concealing CP Selection for Physical Layer Security," in Proc. Military Communications Conference, Oct. 2014.
R. Booth; "A Note on the Application of the Laurent Decomposition to the GSM GMSK Signaling Waveform"; Tropian Inc., Technology White Paper. Jan. 2000.

(56) References Cited

OTHER PUBLICATIONS

S.V. Schell; "Implementation Effects on GSM's EDGE Modulation"; Tropian Inc., Technology White Paper. Jan. 2000.
R. Booth; "A Note on the Application of the Laurent Decomposition to the Gsm Gmsk Signaling Waveform"; Tropian Inc., Technology White Paper.
R. Schiphorst, et al.; "A flexible WLAN receiver"; https://www.researchgate.net/publication/2922546_A_flexible_WLAN_receiver; Dec. 2003.
U. Mengali, M. Morelli; "Decompisition of M-ary CPM Signals into PAM Waveforms"; IEEE Trans. on Information Theory, V 41, No. 5, Sep. 1995.
P.A.LAURENT; "Exact and Approximate Construction of Digital Phase Modulations by Superposition of Amplitude Modulated Pulses (Amp)"; IEEE Trans. on Comm., V. COM-34, No. 2, Feb. 1986.
K.C.Yu, A.J Goldsmith; "Linear Models and Capacity Bounds for Continuous Phase Modulation"; 2002 IEEE International Conference on Communications. Conference Proceedings. ICC 2002 (Cat. No.02CH37333), Apr. 28, 2002.
S.V. Schell; "Implementation Effects on GSM's EDGE Modulation"; Tropian Inc., Technology White Paper.

* cited by examiner

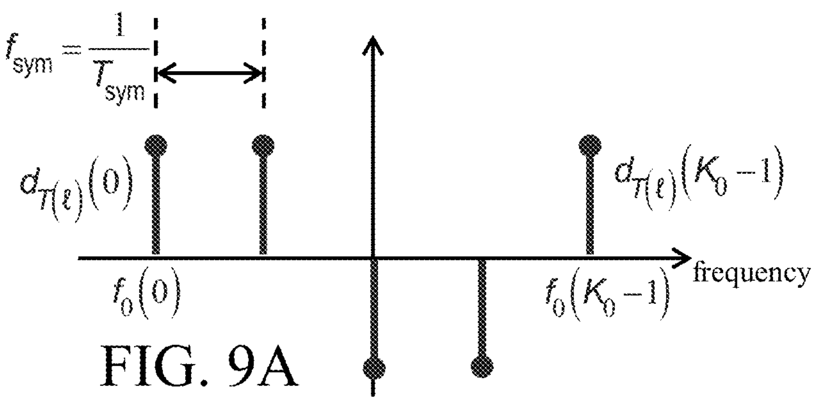
FIG. 9A
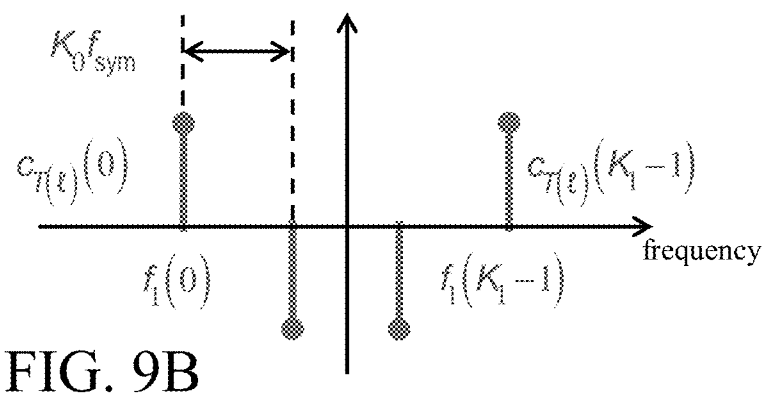
FIG. 9B
$\left[d_{\mathcal{T}(\ell)}(k_0)\right]_{k_0=0}^{K_0-1} c_{\mathcal{T}(\ell)}(0)$
$\left[d_{\mathcal{T}(\ell)}(k_0)\right]_{k_0=0}^{K_0-1} c_{\mathcal{T}(\ell)}(K_1 - 1)$
$s_{\mathcal{T}(\ell)}(K_{sub} - 1)$
$s_{\mathcal{T}(\ell)}(0)$
$f(0)$
frequency
$f_{sym}$
cluster 0
cluster $K_1 - 1$
$f(K_{sub} - 1)$
$K_{sub} = K_0 K_1$
FIG. 9C

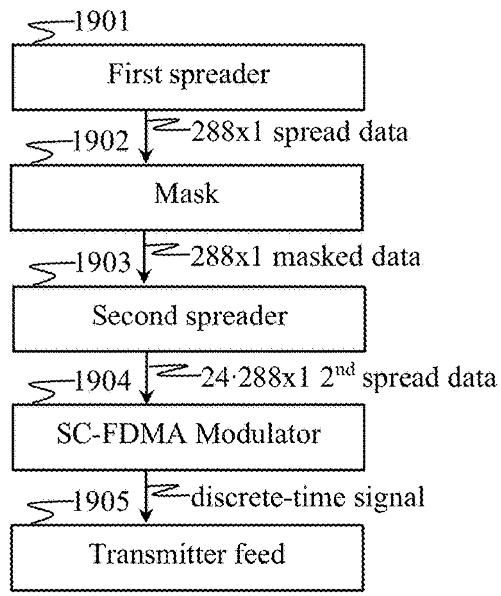
FIG. 19A
1901
First spreader
1902
N (288x1) spread data
Mask
1903
N (288x1) masked data
Second spreader
1904
(24/N)·288x1 2nd spread data
SC-FDMA Modulator
1905
discrete-time signals
Transmitter feed
FIG. 19B
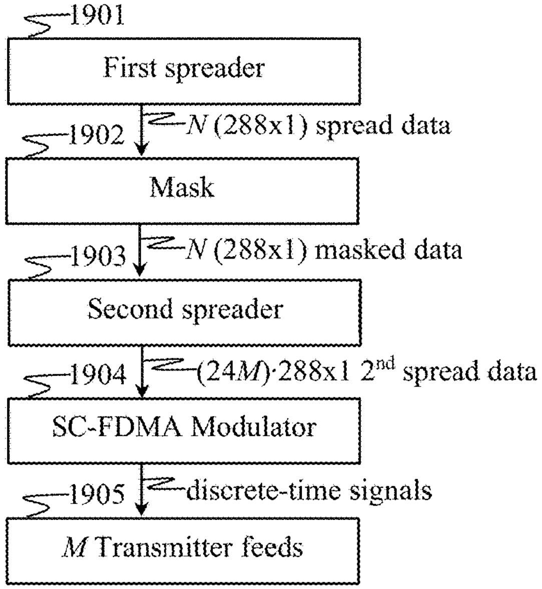
FIG. 19C
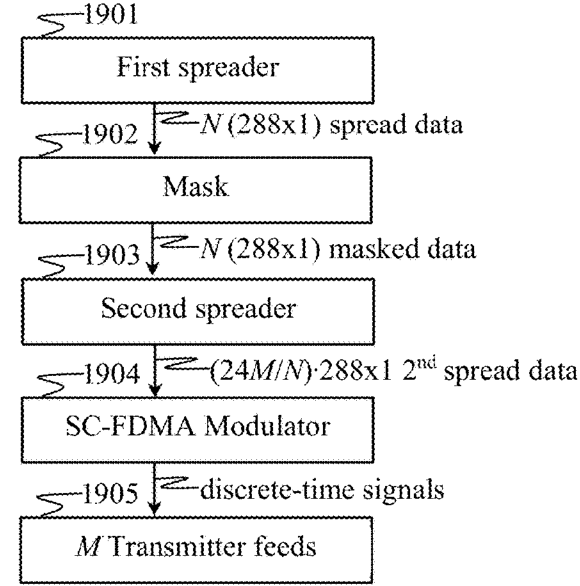
FIG. 19D

RESILIENT MACHINE-TO-MACHINE NETWORKS

CROSS REFERENCE TO PRIOR APPLICATIONS

This application is a National Stage of PCT Appl. No. PCT/US22/25574, filed on Apr. 20, 2022; which claims the priority benefit of U.S. Provisional Pat. Appl. No. 63/177,379, filed on Apr. 20, 2021; each of which is hereby incorporated by reference herein in its entirety.

BACKGROUND

Aspects of this disclosure relate generally to communication systems, and more particularly, to transmission and reception in fifth generation (5G) cellular networks, wireless local area networks (WLAN's), wireless personal area networks (WPAN's) and other wireless networks.

The background description includes information that may be useful in understanding the present inventive subject matter. It is not an admission that any of the information provided herein is prior art or relevant to the presently claimed inventive subject matter, or that any publication, specifically or implicitly referenced, is prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and stacked-carrier multiple access (SCMA) systems employing stacked-carrier spread spectrum (SCSS) modulation formats.

These multiple access technologies have been adopted in various wireless networking and telecommunication standards to provide a common protocol that enables different wireless devices to communicate on a close-proximity, local, municipal, national, regional, and/or even global level. For example, 5G (also called New Radio (NR)) wireless access is being developed with three broad use case families in mind: enhanced mobile broadband (eMBB), massive or enhanced machine-type communications (MTC), and ultra-reliable low-latency communications (URLLC). Beyond 5G (NR) refers to visions for future generations of wireless communications (e.g., 5G-Advanced, 5G-Extended, 6G) that enable groundbreaking high-bandwidth, low-latency, massive capacity, and massive connectivity networks, e.g., using unique network slices in Open Radio Access Network (O-RAN) systems.

However, as the demand for mobile broadband access continues to increase, there exists a need for further improvements in wireless networking and telecommunications technology. Preferably, these improvements should be applicable to other multi-access technologies and the wireless networking and telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that follows. Any of the functions, techniques, aspects, operations, or concepts described in this Summary may be employed in any of the disclosure herein, including the Drawings and Detailed Description.

The components and links of the wireless communication system may take different forms in different implementations. For example, and without limitation, UEs may be cellular devices, Internet of Things (IoT) devices, cellular IoT (CIoT) devices, machine-type communication (MTC) devices, unmanned aerial systems (UASs), navigation systems, vehicles, robotic devices, smart alarms, remote sensors, smart phones, mobile phones, smart meters, personal digital assistants (PDAs), personal computers, wearables, mesh nodes, and tablet computers.

Disclosed aspects can be configured for various services and emerging applications in NR and Beyond-NR, including massive Machine Type Communication (MTC), which supports massive connectivity with packet transmission at low energy expenditure, and Ultra Reliable Low latency Communication. Disclosed aspects utilize multitone modulation, which can be configured for any of NR's candidate waveforms, including orthogonal frequency division multiplexing (OFDM), SC-FDM, SC-FDMA, filter bank multi-carrier (FBMC), generalized frequency division multiplexing (GFDM), and others. Disclosed aspects employ multitone (e.g., multicarrier) spread spectrum transmission, which can employ any of various linear transforms to spread energy of transmitted symbols over the subcarriers.

Disclosed aspects can be configured for non-orthogonal multiple access (NOMA) techniques, including power-domain techniques, such as super-position coding NOMA (SPC-NOMA), code-domain techniques, such as sparse code multiple access (SpCMA) or pattern domain multiple access (PDMA), inter-leaver techniques, such as interleave division multiple access (IDMA), resource spread multiple access (RSMA), or multi-user shared access (MUSA). NOMA is provisioned when multiple users are multiplexed onto the same resource in a manner that allows them to be separated at the receiver using linear-algebraic signal processing methods. NOMA can comprise spreading over multiple resources. In one example, NOMA techniques disclosed herein might configure non-orthogonal spreading over frequency, as well as space and/or polarization.

In some implementations, UEs may communicate with each other directly via a device-to-device (D2D) link 110 or some other similar type of direct link. D2D can be implemented in mesh networks; peer-to-peer or point-to-point (P2P) networks; point-to-multipoint (P2MP) networks; multipoint-to-point (MP2P) networks; or multipoint-to-multipoint (MP2MP) networks, and/or might be referred to using some other terminology; and can be instantiated within cellular networks, wireless local-area networks (WLAN's), and wireless personal area networks (WPAN's). D2D communication can enable direct communication between devices without going through the core of a cellular network. The devices in D2D mode retrieving from local source devices are typically fewer than those communicating with a TRP, can access the channel faster, and consume less power, e.g., without energy-consumptive link setup and tear-down requirements, among other benefits.

Various types of network-to-device links and D2D links may be supported in the wireless communication system. For example, D2D links may include, without limitation, machine-to-machine (M2M) links, MTC links, vehicle-to-vehicle (V2V) links, and vehicle-to-anything (V2X) links. Network-to-device links may include, without limitation, uplinks (or reverse links), downlinks (or forward links), vehicle-to-network (V2N) links, and V2X links. Broadcast links may include, without limitation, V2V links, V2X links, M2M links, and MTC links. In some aspects, V2V and V2N communication may be considered as examples of V2X communication.

In some implementations, UEs may employ at least some TRP functionality. In some aspects, the TRP may include 5GNR functionality with an air interface based on OFDM. The functionality of a TRP may be similar in one or more aspects to (or incorporated into) the functionality of a CIoT base station (C-BS), a NodeB, an evolved NodeB (eNodeB), radio access network (RAN) access node, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other suitable entity. In different scenarios, a TRP may be referred to as a gNodeB (gNB), an eNB, a base station, an access point (AP), a data aggregation point (DAP), or some other terminology.

In one example, a resilient mesh network is configured to enable low-cost, low probability of detection (LPD) communication of low-rate control and traffic data in contested environments. One aspect uses a combination of spread spectrum multitone modulation with unpredictable (e.g., randomly selected) spreading codes and time jitter configured to conceal cyclic features of the multitone modulation and prevent spoofing by sophisticated adversaries. In one example, SCSS can be employed. In some LPD aspects, a network mask conceals cyclic features of the spreading format: and a destination mask enables receivers to detect and separate network signals intended for that receiver, and excise network signals intended for other receivers (e.g., by using low-complexity linear-algebraic code nulling algorithms that are inherently resilient to near-far interference between network nodes).

Disclosed aspects can be seamlessly integrated with spatial/polarization diverse antenna arrays and multifeed dimensional multitone modems, to further reduce vulnerability of the signal transmitters to radiometric and interferometric (cross-correlation) methods used by adversaries to intercept those signals, provide further protection against wideband and narrow band interference (e.g., jamming), and allow transceiver implementations using low size-weight-and-power (SWaP) and low cost (SWaP-C) single-chip transceiver architectures. Disclosed aspects can be additionally configured to provide low latency and/or energy-efficient packet transmission for at least some modes of operation.

In some aspects, transmission apparatus and methods provide for spreading a data signal with a length-N spreading code (e.g., an inner code) to produce a first spread data signal, wherein N is a plurality of subcarrier frequencies in each of a plurality L of clusters; modulating a link mask onto the spread data signal to produce a first masked signal; spreading the first masked signal with a length-L spreading code (e.g., an outer code) to produce a second spread data signal; and modulating the second spread data signal onto a plurality of subcarriers to produce a multitone transmission signal, wherein the plurality of subcarriers equals the product of N and L, N·L. Some instances might be configured to modulate a network mask onto the second spread data signal before the second spread data signal is modulated onto the plurality of subcarriers.

The link mask might include a destination mask configured to enable a receiver to detect and separate signals intended for the receiver, and excise signals intended for other receivers. The link mask might include a source mask configured to enable the receiver to separate multiple transmission signals (from different sources) intended for the receiver. The network mask can be configured to conceal cyclic features in a spreading format used to spread the data signal and/or the first masked signal. In some aspects, modulating the second masked signal onto the plurality of subcarriers can comprise modulating the second masked signal onto a plurality of antenna feeds.

In some aspects, a source mask is also added to the first spread data signal in order to improve separation of multiple transmitted signals at a target receiver. Exemplary source masks include, but are not limited to, a mask unique to the transmitter, e.g., provisioned at network entry: a member of a finite alphabet of masks known to the receivers and unpredictably chosen by the transmitter over each slot: or a mask that can be estimated by the receiver as part of the despreading process, e.g., a cyclic phase ramp that induces a cyclic delay on the first spread signal, where the separation between allowable delay values is much greater than delay induced by the network. A receiver may employ blind methods that do not require the pilot signal, or partially blind methods for separating signals and/or excising interference. Examples of blind, partially blind, and non-blind despreading methods that can be employed as despreading disclosed herein, and other method and apparatus aspects disclosed herein, can be found in U.S. Pat. Nos. 9,648,444, 10,812,955, 10,971,768, 8,363,744, 9,928,212, and 7,079,480; U.S. Pat. Appl. No. 63/138,300; and PCT Appl. No. PCT/US21/16334; all of which are incorporated by reference in their entireties.

In some aspects, the data signal is multiplexed (MUX'd) with a jitter symbol that encodes the value of time jitter applied to the multitone output signal, e.g., by jittering the output clock, or by modulating the multitone subcarriers by a frequency ramp proportional to the jitter value. The time jitter can be unpredictably varied between transmit slots, thereby further reducing vulnerability of signal transmitters to cyclic feature methods used by adversaries to intercept those signals, e.g., by detecting the cyclic prefix of the signal.

In some aspects, the data signal is multiplexed with a pilot symbol that simplifies the ability for the receiver to detect the transmitted signal and extract it from interfering signals also impinging on the receiver, even if those interfering signals are not orthogonal to the transmitted signal, e.g., in non-orthogonal multiple access (NOMA) systems.

The aforementioned instances of spreading and modulating can comprise means for spreading and means for modulating, such "means for" comprising circuits, computer processors, devices, systems, and/or combinations thereof configured to perform the disclosed aspects.

The aforementioned instances of spreading and modulating can comprise configuring circuits, computer processors, devices, systems, and/or combinations thereof to perform the disclosed spreading and modulating. Such configuring can comprise designing, assembling, manufacturing, programming, and/or otherwise configuring circuits, computer processors, devices, systems, and/or combinations thereof.

In some instances, computer program code is provisioned to comprise instructions that configure at least one computer processor or other programmable circuit(s) to perform the disclosed aspects. In some instances, a computer program product stored on at least one non-transitory computer-readable memory comprises instructions that configure at least one computer processor or other programmable circuit(s) to perform the disclosed aspects.

In one aspect, modulating the second masked signal onto a plurality of subcarriers comprises adding time jitter to the multi-tone transmission signal. The time jitter can be configured to conceal cyclic features of multi-tone modulation. In some aspects, the length-N spreading code comprises an orthogonal code, such as a Hadamard code. In one aspect, the length-L spreading code comprises a stacked carrier spread spectrum code. At least one of the length-L spreading code, the network mask, and time jitter added to the multi-tone transmission signal can be unpredictably selected in each transmission time slot.

In some aspects, receiver apparatus and methods provide for demodulating a received multitone transmission signal into a plurality of subcarriers to produce a demodulated signal; demasking the demodulated signal by removing a link mask from the demodulated signal to produce a demasked signal; despreading the demasked signal to produce a despread signal; demodulating symbols in the despread signal to produce demodulated symbols; and extracting jitter from the demodulated symbols to produce corrected demodulated symbols. In some instances, demasking can comprise removing a network mask from the demodulated signal.

Some aspects further comprise estimating a time-of-arrival (TOA) of the received multitone transmission signal from the corrected demodulated symbols. In aspects in which the transmitted signal is modulated by timing jitter, the transmitted jitter value can be used to recover the true observed TOA from the estimated jittered TOA. Some aspects further comprise computing at least one of positioning and timing synchronization from the TOA.

Demasking might comprise performing QR Decomposition (QRD), e.g., using a Modified Gram-Schmidt Orthogonalization (MGSO) procedure, after removing the network mask from the demodulated signal. Demasking might comprise performing algebraic code nulling to excise at least one of a set of signals intended for at least one other receiver, interference, jamming signals, and spoofers.

Despreading can employ linear combining weights. In some aspects, despreading is configured to remove Hadamard spreading within each cluster of subcarriers.

In some instances, demodulation is performed using a multifeed dimensional multitone modem communicatively coupled to at least one of a spatial-diverse antenna array or a polarization-diverse antenna array. Demodulating might comprise computing despreading weights that enable data and time jitter to be extracted from the received multitone transmission signal.

The aforementioned instances of demasking, despreading, and demodulating can comprise means for demasking, means for despreading, and means for demodulating, such "means for" comprising circuits, computer processors, devices, systems, and/or combinations thereof configured to perform the disclosed aspects.

The aforementioned instances of demasking, despreading, and demodulating can comprise configuring circuits, computer processors, devices, systems, and/or combinations thereof to perform the disclosed demasking, despreading, and demodulating. Such configuring can comprise designing, assembling, manufacturing, programming, and/or otherwise configuring circuits, computer processors, devices, systems, and/or combinations thereof.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 9A illustrates a baseband cluster represented by data symbols modulated onto subcarrier frequencies.

FIG. 9B depicts a spreading code configured to spread each baseband cluster.

FIG. 9C depicts an exemplary SCSS signal.

FIG. 19A-19D show functional aspects of the disclosure configured to be employed in a 5GNR system.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. An OFDMA network may implement a radio technology such as NR (e.g. 5GNR), Evolved UTRA (E-UTRA), Ultra Mobile Broadband (UMB), IEEE 802.11 (Wi-Fi), IEEE 802.16 (WiMAX), IEEE 802.20, etc. UTRA and E-UTRA are part of Universal Mobile Telecommunication System (UMTS). NR is an emerging wireless communications technology under development in conjunction with the 5G Technology Forum (5GTF). The techniques described herein may be used for the wireless networks and radio technologies mentioned above as well as other wireless networks and radio technologies.

Figure 1:
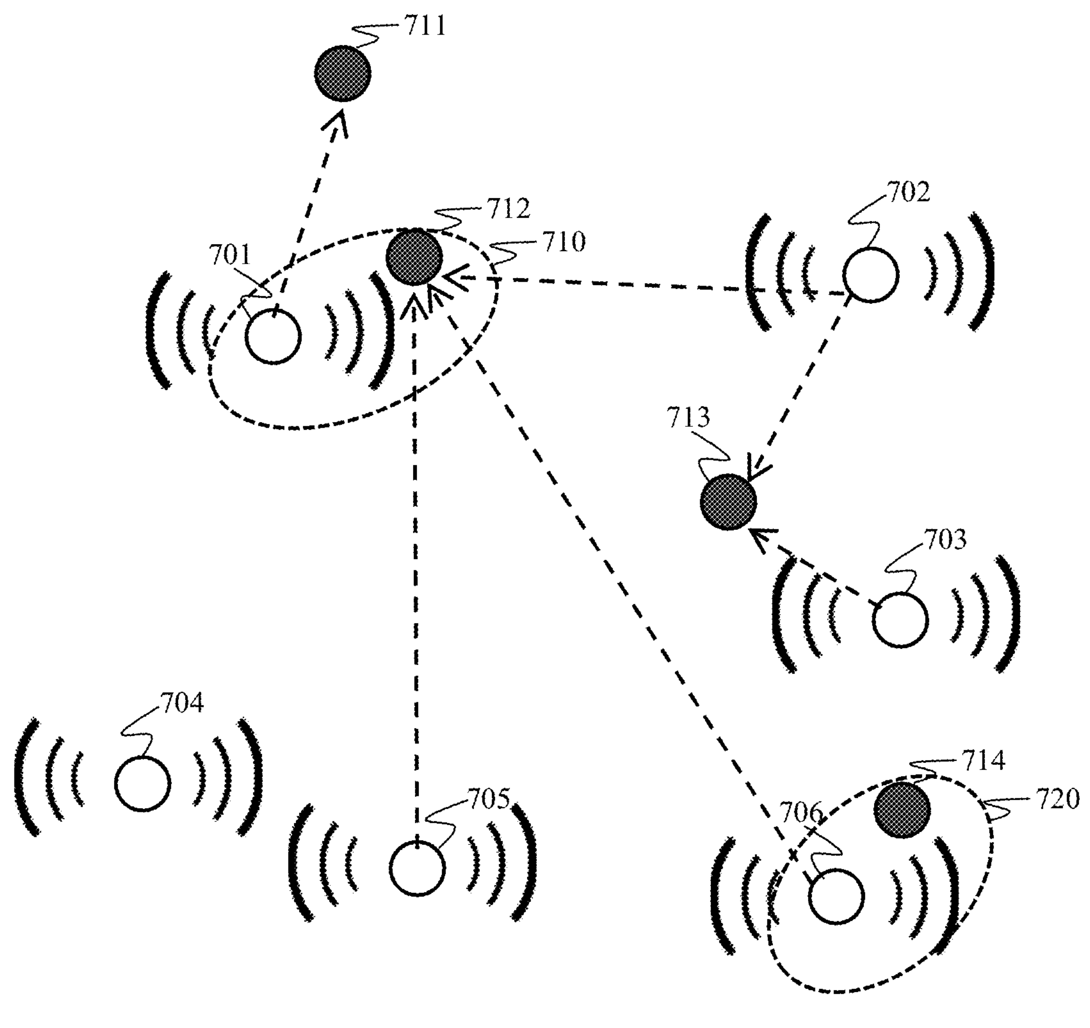
FIG. 1 is a block diagram conceptually illustrating an example communication network comprising a variety of possible network topologies, in accordance with certain aspects of the present disclosure.

Disclosed aspects can be configured to employ any of the network topologies illustrated in FIG. 1. Transmitting nodes 701-706 and receiving nodes 711-714 are depicted in this example. Point-to-point (P2P) communication occurs between nodes 701 and 711. Node 712 is depicted in a multipoint-to-point communication (MP2P) link with nodes 702, 705, and 706. MP2P configurations might employ simultaneous or serial multi-user reception. Node 702 is depicted in a point-to-multipoint (P2MP) link with nodes 712 and 713. P2MP configurations might employ simultaneous or serial multi-user transmission. Node 704 is shown in a broadcast mode, such as a "hearbeat" or node advertisement mode. Node 714 is shown in a monitor (e.g., network discovery) mode. In some aspects, such as when transmitters and receivers are in close proximity (710 and 720), disclosed aspects can improve resilience to near-far interference.

The nodes 701-706 and/or 711-714 might each comprise a spatial and/or polarization diverse multifeed transceiver, in which an array of spatial/polarization diverse antennas are coupled to a transmit/receive switch and optional beamforming network. The transmit/receive switch and/or beamforming network can be configured to feed multiple receivers during signal reception and/or environment monitoring (e.g., node/network discovery, RFSA) operations, and can be fed by multiple transmitters during signal transmission operations. In one example, a received multifeed, multitone signal is demodulated from the feeds during reception intervals, and modulated onto the feeds during transmit intervals. For example, the transceiver might have a dimensional tuner in which a harmonic mixer transforms the individual transceiver feeds to/from a single wideband signal, and a dimensional multitone modem that transforms the single wideband signal to/from multiple subcarriers using combinations of fast Fourier transform (FFT) and inverse FFT (IFFT) operations and polyphase filtering modules.

Disclosed aspects can be configured for decentralized network topology types. By way of example, but without limitation, a network topology might employ little or no "network infrastructure," i.e., base stations, also known as Node B's (NB's) and (in 5GNR networks) gNode B's (gNB's), access points (AP's), data aggregation points (DAP's) and/or network operations centers (NOC's). In some aspects, physical-layer configuration provides for simultaneous (same-slot) or serial (different-slot) P2P, M2MP, and/or MP2P connectivity between any network users. In some aspects, physical-layer configuration provides for LPD broadcast, resilient monitoring modes for network discover/synchronization, and/or RF situation awareness (RFSA).

Aspects disclosed herein can configure the nodes to employ network protocols that provide for node discovery, network handshaking, and waveform control messages. For example, the network can provision LPD broadcast modes, or "heartbeats," and network monitoring modes that can both detect those heartbeats and provide RF situational awareness (RFSA) for network users. The network can transmit control messages that adjust or provision aspects of PHY or medium-access-control (MAC) aspects of the network (e.g., to change network and link masks if they are compromised by an adversary, adapt transmission frequencies to avoid and/or exploit ambient interference (snuggling), develop directional transmit solutions using explicit beamsteering methods based on trading of channel state information (CSI), and/or develop implicit methods based on exploitation of reciprocity of the transmission channels.

Figure 2:
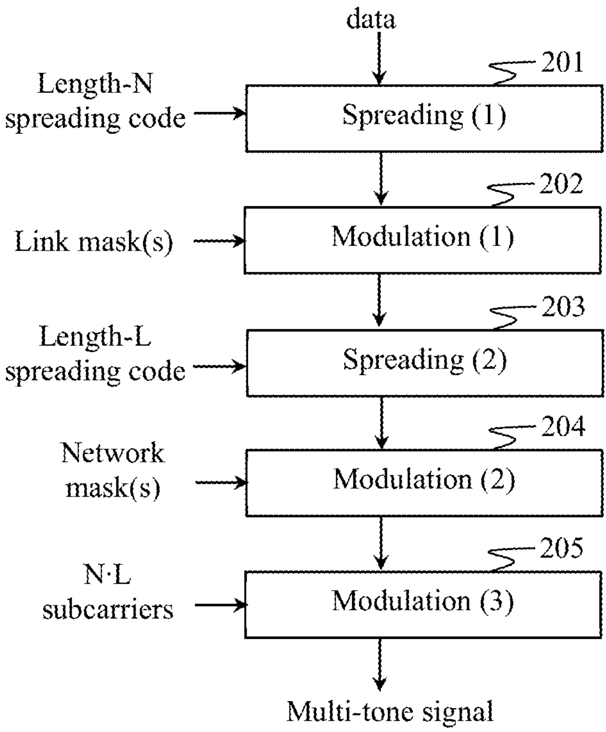
FIGS. 2-5 illustrate exemplary method and apparatus implementations for generating multitone transmission signals according to some of the disclosed aspects.

FIG. 2 illustrates method and apparatus implementations of some of the disclosed aspects. A data signal is spread (e.g., via first spreading) 201 with a length-N spreading code to produce a first spread data signal, wherein N is a plurality of subcarrier frequencies in each of a plurality L of clusters. This can be referred to as an inner code. At least one link mask (e.g., destination mask and/or source mask) is modulated (e.g., via first modulation) 202 onto the spread data signal to produce a first masked signal. The first masked signal is spread (e.g., via second spreading) 203 with a length-L spreading code to produce a second spread data signal. This can be referred to as an outer code. At least one network mask might be (optionally) modulated (e.g., via second modulation) 204 onto the second spread data signal to produce a second masked signal. The network mask can be omitted in applications in which it is not necessary to hide cyclic features caused by spreading. The second masked signal or the second spread data signal is modulated (e.g., via third modulation) 205 onto a plurality of subcarriers to produce a multitone transmission signal, wherein the plurality of subcarriers equals the product of N and L, i.e., N·L.

The multitone transmission signal generated in FIG. 2 is then transmitted to a receiver. The destination mask can be configured to enable the receiver to detect and separate signals intended for the receiver, and excise signals intended for other receivers. The source masks can improve separation of multiple transmitted signals intended for the receiver. For example, the source masks can enable the receiver to separate transmissions arriving with nearly-identical TOA's. The network mask can be configured to conceal cyclic features in a spreading format used to spread 201 the data signal and/or spread 203 the first masked signal. In one aspect, modulating 205 the second masked signal onto the subcarriers comprises providing time jitter to the multitone transmission signal. The time jitter can be configured to conceal cyclic features of multitone modulation.

In one example, the length-N spreading code comprises a Hadamard code and the length-L spreading code comprises a stacked carrier spread spectrum code. Multitone signal transmission might employ multiple time slots. In some aspects, at least one of the length-L spreading code, the network mask, and time jitter added to the multitone transmission signal are randomly selected in each transmission time slot.

One or more additional source masks might be also added to the first spread data signal. This can help a receiver separate multiple received transmissions. Exemplary source masks include, but are not limited to, a mask unique to the transmitter (e.g., provisioned at network entry); a member of a finite alphabet of masks known to the receiver(s) and unpredictably selected by the transmitter over each slot; or a mask that can be estimated by the receiver(s) as part of the despreading process, e.g., a cyclic phase ramp that induces a cyclic delay on the first spread signal, where the separation between allowable delay values is much greater than delay induced by the network.

Figure 3:
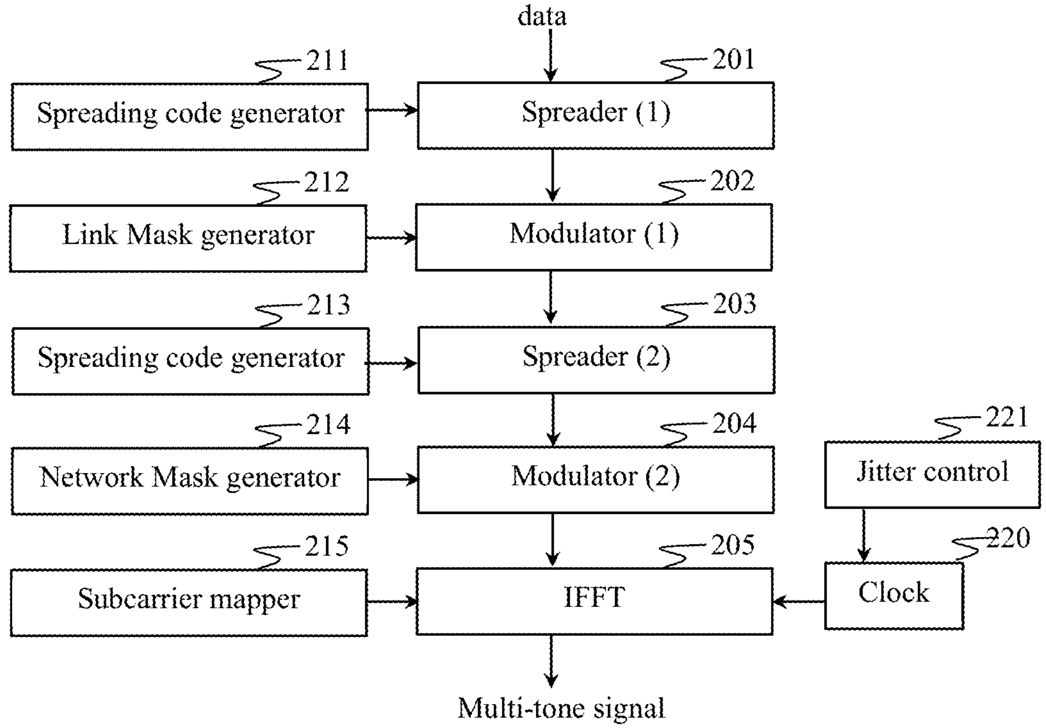

FIG. 3 illustrates method and apparatus implementations of some of the disclosed aspects. A data signal is spread (e.g., via a first spreader) 201 with a length-N spreading code (e.g., produced by a first spreading code generator 211) to produce a first spread data signal, wherein N is a plurality of subcarrier frequencies in each of a plurality L of clusters. A link mask (e.g., produced by a link mask generator 212) is modulated (e.g., via first modulation) 202 onto the spread data signal to produce a first masked signal. The first masked signal is spread (e.g., via second spreading) 203 with a length-L spreading code (e.g., produced by a second spreading code generator 213) to produce a second spread data signal. A network mask (e.g., produced by a network mask generator 214) might be modulated (e.g., via second modulation) 204 onto the second spread data signal to produce a second masked signal. The second masked signal or the second spread data signal is modulated, e.g., via a third modulator, such as an inverse fast Fourier transform (IFFT) or other multicarrier modulator 205, onto a plurality of subcarriers to produce a multitone transmission signal, wherein the plurality of subcarriers equals N·L. The subcarriers may be selected by a subcarrier mapper 215, such as based on a scheduled uplink or downlink channel. The modulator 205 might be configured to provide time jitter to the multitone transmission signal. Jitter might be computed (or otherwise provided for) and added (e.g., via a jitter controller 221) to a clock signal produced by a clock 220 and used by the modulator 205 for timing. For example, a random or pseudorandom jitter can be generated (or selected) in jitter controller 221 and used to jitter the clock timing offset (e.g., in clock 220) and/or add a phase-ramp to the multitone modulator 205.

The link mask (produced by mask generator 212) can comprise at least one destination mask and/or source mask. For example, a source mask and destination mask might be element-wise multiplied together to produce the link mask. The destination mask can enable a receiver to separate (and excise) signals intended for different receivers. The source mask is added to the first spread data signal in order to improve separation of multiple transmitted signals intended for the receiver. In one example, source masks can enable the receiver to separate transmissions arriving with nearly-identical TOA's.

In one aspect, a source mask comprises a "pseudo-delay", or cyclic phase shift—e.g., a phase ramp across the subcarriers, which induces a cyclic delay in the discrete-time signal. If pseudo-delays have delay differences that are larger than the delay caused by TOA, pseudo-delays can be used to by the receiver to separate received transmissions. In such aspects, the receiver might know or learn the pseudo-delay for each detected transmitter.

In one aspect, the pseudo-delay is unique to each node. The receiver might be configured to deduce a transmitter's identity based on a measurement of the pseudo-delay+TOA. The receiver can remove the transmitter's pseudo-delay to determine the TOA. The pseudo-delay might be encoded within the baseband signal, so the receiver can remove it after despreading. This can aid in signal authentication, especially when combined with copy-aided direction-finding algorithms (e.g., in multifeed receivers).

In another aspect, the pseudo-delay might be changed from slot to slot. This can enable the receiver to both identify the transmitter and authenticate the transmitter. The pseudo-delay might be configured to provide a virtual signaling channel that can be used to convey additional information about the transmitter.

Figure 4:
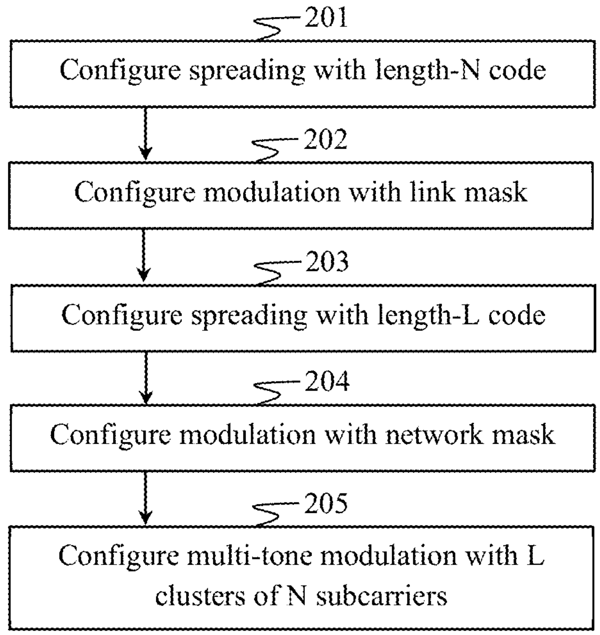

FIG. 4 illustrates method implementations according to some of the disclosed aspects. The term "configure" conveys one or more steps or processes that cause one or more configurable elements to perform a designated feature. By way of example, hardware, firmware, and/or software can be configured to perform the designated feature. In one instance, an electronic circuit is configured to perform the designated feature by designing the circuit, manufacturing the circuit, and/or connecting circuit components. Such an electronic circuit might be an application-specific integrated circuit (ASIC), for example. In one instance, one or more computer processors are configured to perform the designated feature, which might include one or more steps or processes, such as writing instructions in computer program code, assembling pre-written code modules, linking to a library of software functions and/or objects, storing the code in memory, reproducing computer program code, distributing the code over a network, compiling the code into an executable program, storing the executable program in memory, linking to another executable program, loading the executable program into a processing system, causing the executable program to run, and/or provisioning hardware, network, and/or software resources to run the executable program. The one or more computer processors might include a computer processing unit (CPU), a graphics processing unit (GPU), a digital signal processor (DSP), a baseband unit (BBU), a modem, a microprocessor, a microcontroller, a general purpose processor (GPP), and/or a field-programmable gate array (FPGA).

A first step configures 201 a data signal to be spread with a length-N spreading code to produce a first spread data signal, wherein N is a plurality of subcarrier frequencies in each of a plurality L of clusters. A second step configures 202 modulation of the link mask onto the spread data signal to produce a first masked signal. A third step configures 203 spreading of the first masked signal with a length-L spreading code to produce a second spread data signal. A fourth step configures 204 modulation of a network mask onto the second spread data signal to produce a second masked signal. A fifth step configures 205 multitone modulation of the second masked signal onto a plurality of subcarriers to produce a multitone transmission signal, wherein the plurality of subcarriers equals the product of N and L, i.e., N·L.

The destination mask can be configured to enable the receiver to detect and separate signals intended for the receiver, and excise signals intended for other receivers. The source masks can be configured to improve separation of multiple transmitted signals intended for the receiver. The network mask can be configured to conceal cyclic features in a spreading format used to spread the data signal and/or spread the first masked signal. In one aspect, modulating the second masked signal onto the subcarriers comprises providing time jitter to the multitone transmission signal. The time jitter can be configured to conceal cyclic features of multitone modulation.

In one example, the length-N spreading code comprises a Hadamard code and the length-L spreading code comprises a stacked carrier spread spectrum code. Multitone signal transmission might employ multiple time slots. In some aspects, at least one of the length-L spreading code, the network mask, and time jitter added to the multitone transmission signal are randomly selected in each transmission time slot.

With reference to the network topologies depicted in FIG. 1, and the apparatus and method aspects disclosed in other figures herein (e.g., at least FIGS. 2-4), in a given slot, a node might communicate with any number of other nodes in the network using a unique, pseudorandomly determined destination mask for the intended receiver node(s). This can enable instantiation of both P2P links in which a single transmitter transmits data to a single receiver, and MP2P links in which multiple transmitters transmit data to a single receiver. Due to code-nulling or Type C linear-mean-square-error (LMMSE) methods employed at the receiver(s), which maximize the signal-to-interference-and-noise ratio (max-SINR) of the received transmitted signals without knowledge of the end-to-end channel response, i.e., "blind despreading methods," the links are extremely resilient to near-far interference between closely spaced transmitters and receivers. The network can support broadcast modes, in which a transmitting node transmits signals, e.g., "heartbeats" on a regular basis, in order to enable receiving nodes to detect and geolocate the transmitting node. In this mode of operation, the transmitting node might not employ a destination mask, in order to allow the receiving nodes to acquire the transmitting node, or may employ a pseudorandom network access or node discovery mask known to some or all of the receivers. The network can also support monitoring modes, in which a receiving node is configured to receive data, e.g., in order to develop RF situational awareness (RFSA) about the transmission channel, or acquire transmitting nodes in the network, e.g., by monitoring the channel for heartbeats.

Furthermore, the network can support P2MP links in which a transmitter transmits data to multiple receivers, such as by partitioning spreading codes onto a different orthogonal frequency set for each intended receiver. Each receiver can deemphasize the frequencies assigned to other receivers, and adaptively remove that link(s) from its solution. In addition, if each link is transmitted at the same power, an adversary cannot learn anything about intended receive links, providing an additional operational security advantage to the network.

Disclosed aspects can provision network slices to provide logical (virtual) networks customized to serve different business purposes, service level requirements, and/or applications. Typically, each network slice comprises an end-to-end composition of network resources required to satisfy a specific performance (and economic need) for a particular service class or customer application. Network slicing can offer a conceptual way of viewing and realizing service provider networks by building logical networks on top of a common and shared infrastructure layer. Network slices can be created, changed, and removed by management and orchestration functions, which includes provisioning radio access network resources.

In an exemplary application, a network service provider might employ network slicing to differentiate characteristics and resources for different classes of services. In one instance, destination masks, source masks, and/or network masks can be allocated to different network slices. This can configure a network to provision shared spectrum to support different service level requirements, such as enabling receivers to employ code-nulling methods to distinguish communications in their assigned slice from communications in other slices. By way of example, a network mask, source mask, and/or destination mask might be used to provision a network slice characterized by performance criteria, such as latency, bandwidth, grant-free access, and/or transmit power.

To configure network slicing in 3GPP networks (such as 5GNR), disclosed aspects can be adapted to fit the required radio signaling format of the 3GPP network(s). In one example, radio access network resources (e.g., time, frequency, and/or space) might be partitioned into separate network slices, wherein a first mask (e.g., a link mask and/or a network mask) establishes a first network slice, and a second mask (e.g., a link mask and/or a network mask) establishes a second network slice. The masks can be configured to enable receivers to employ code-nulling methods to distinguish communications in their assigned slice from communications in other slices.

In some aspects, serial access of each link can be provided to further reduce the power delivered to each intended receiver, reducing the intercept footprint of the transmitter, and enabling energy-efficient data transmission. Both intercept vulnerability and energy efficiency are further improved in some aspects, by allowing the transmission of data signals without prior call setup or "request-to-send" and "clear-to-send" handshakes with the receiver. In 5GNR, such operations are referred to as "grantless" or "grant-free" access. In some aspects, the data signals are sent using connectionless User Datagram Protocols (UDP) that does not require an acknowledgement (ACK) from the receiver, further improving energy efficiency of the data transmission, and improving operational security of the network.

In some aspects, spreading over frequency and space/polarization dimensions allows the number of data bits being transmitted to be much less than the time-bandwidth product of the transmission packet. This and transmission of low-rate UDP packets from an IIoT device to a data aggregation point on an ad-hoc (grantless) basis makes these aspects especially well suited for energy-constrained applications, e.g., transmission to, from, and between industrial Internet of Thing (IIoT) devices with low power availability.

Figure 5:
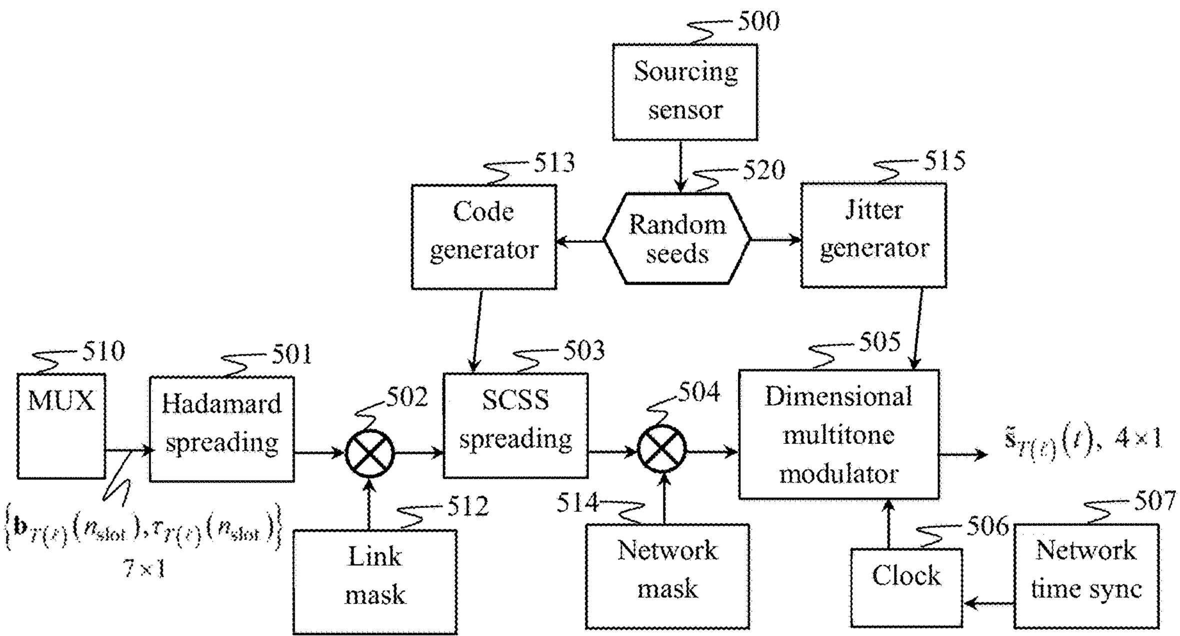

FIG. 5 illustrates method and apparatus aspects for an exemplary implementation of baseband processing. Methods described herein include methods for configuring or provisioning (e.g., in software, firmware, and/or hardware) disclosed functional elements, such as those depicted as blocks in the figures.

In one aspect, first spreading 201 is implemented via Hadamard spreading 501, with inputs comprising data symbol vector $b_{T(l)}(n_{slot})$, time jitter $\tau_{T(l)}(n_{slot})$ (optional), and pilot(s) multiplexed 510 together. T(l) denotes an $l^{th}$ transmitter, $n_{slot}$ is a slot index, and data symbol vector $b_{T(l)}(n_{slot})$. The time jitter $\tau_{T(l)}(n_{slot})$ might be produced by jitter generator 515. In-cluster spreading 501 of N symbols (e.g., comprising the data symbols, time jitter, and at least one pilot) onto 160 baseband subcarriers uses a 160×N orthogonal Hadamard matrix provides an additional factor-of-160/N spreading gain at the receiver. The pilot symbols enable low-complexity inverse fast Fourier transform (IFFT) least-squares (IFFT-LS) methods that blindly detect each link intended for the receiver, estimate the pseudo-TOA's (link TOA, plus time jitter) of those links, and develop despreading weights that allow the payload data and time jitter to be extracted from the received data. Reception of the time jitter allows the true link TOA to be estimated and used in subsequent positioning and network timing synchronization algorithms. The spread output signal of the Hadamard spreading 501 can be expressed by:

$$d_{T(l)}(n_{slot}) = C_{base}\begin{bmatrix} 1 \\ b_{T(l)}(n_{slot}) \end{bmatrix}$$

where $C_{base}$ is the Hadamard matrix, and "1" maps the first column of $C_{base}$ to a pilot signal.

Link mask generation 512 (which can comprise destination mask generation and/or source mask generation) produces at least one 160×1 link mask vector, $C_{R(l)}(n_{slot})=\exp\{j\theta_{R(l)}(n_{slot})\}$, where R(l) denotes an $l^{th}$ receiver. Modulator 502 modulates the 160×1 link mask onto the 160×1 spread output signal. The destination mask is configured to enable receivers to detect and separate network signals intended for that receiver, and excise network signals intended for other receivers. The source mask is configured to enable a receiver to separate multiple transmitted signals (from different transmitter sources) intended for the receiver.

In one instance, second spreading 203 can be implemented via SCSS spreading 503. The stacked-carrier spreading is accomplished by modulating payload data onto 160-subcarrier baseband clusters, which are then spread over 20 frequency clusters and M transceiver feeds to produce an SCSS-spread signal.

The SCSS modulation format allows received subcarriers to be blindly despread , i.e., without knowledge of the spreading codes incorporated at the transmitter, using low-complexity least-squares code nulling methods that are inherently resilient to near-far interference between network nodes, and provide automatic excision of narrow band and wideband non-network interference, e.g., jamming. Additionally, because the signal is spread across transmit feeds as well as frequency, the PHY provides a factor-of-M reduction in interferometric detection strength for an M-feed transceiver. Moreover, this spreading format allows blind despreading of the received signal on a slot-by-slot basis.

In one example, the lower-PHY multitone modulation format transports data over 3,200 subcarriers in ½ ms time intervals, or slots, synchronized to a common time standard using cross-network calibration methods, with 6 kHz separation between subcarriers (19.2 MHz transmit bandwidth, e.g., occupying a single 20 MHz ISM or U-NII band channel). The multitone modulation format can enable communication over 20 kilometer ranges, and is resilient to Doppler shift commensurate with ±100 mph speed differences between users (50 mph closing or separating speeds).

A specific instance 514 of network mask generation (e.g., 214) produces a 3200×1 network mask vector, $c_{net}(n_{slot})=\exp\{j\theta_{net}(n_{slot})\}$, which is configured to conceal cyclic features of the spreading format. Modulator 504 modulates the network mask $c_{net}(n_{slot})$ onto the SCSS-spread signal (i.e., the outer code), producing network-masked signal:

$$S_{T(l)}(n_{slot})=\{G_{T(l)}(n_{slot})\otimes(c_{R(l')}(n_{slot})\circ c_{T(l)}(n_{slot})\circ d_{T(l)}(n_{slot}))\}\text{diag}\{c_{net}(n_{slot})\},$$

where $d_{T(l)}(n_{slot})$ is the L×1 node l first spread signal (Hadamard matrix output), $c_{T(l)}(n_{slot})$ is the L×1 node l source mask, and $c_{R(l')}(n_{slot})$ is the L×1 node l' (l' is the receive node index) destination mask, $G_{T(l)}(n_{slot})$ is the M×K second spreading code, and $c_{net}(n_{slot})$ is the KL×1 network mask, and where "∘", "⊗" and diag{•} are the element-wise multiply (Hadamard or Shur product), Kronecker product, and vector-to-diagonal operation, respectively.

Spreading over the inner code dimension can be expressed by:

$$S_{T(l)}(n_{slot})=\{(c_{R(l')}(n_{slot})\circ c_{T(l)}(n_{slot})\circ d_{T(l)}(n_{slot}))\otimes G_{T(l)}(n_{slot})\}\text{diag}\{c_{net}(n_{slot})\}$$

A dimensional multitone modulator 505, part of a dimensional multitone modem, transforms the SCSS-spread signal to subcarriers, such as via an IFFT, to produce a discrete-time output signal $s_{T(l)}(t)$ for each antenna feed. A clock 506 and network timing synchronization circuitry 507 are also provisioned, as depicted in the figure. In both cases the product $c_{R(l')}(n_{slot})\circ c_{T(l)}(n_{slot})$ comprises the link mask between transmit node l and receive node l'.

Spreading over the outer or inner code dimensions can provide different benefits. For example, spreading over the outer code dimension better exploits frequency-selective multipath, as it more strongly effects the channel variation between spread signal clusters, than the channel variation within each spread cluster. The max-SINR receiver despreader can exploit that diversity to better separate and extract intended network signals from in-network and (for multifeed receivers) jamming and out-of-network interference. Conversely, inner code spreading allows TOA to be estimate to higher precision at the receiver.

In an exemplary aspect, code generation 513 and jitter generation 515 are provisioned with randomized inputs from a random seed generator 520, which might be communicatively coupled to a sourcing sensor 500 and configured to generate random seeds from sensor data produced by the sourcing sensor 500, such as in response to measurements of random environment phenomena. The code generator 513 provides randomized or unpredictable codes $G_{T(l)}(n_{slot})$ for SCSS spreading 503, and the jitter generation 515 provides time jitter $\tau_{T(l)}(n_{slot})$ to the modulator 505.

Incorporation of unpredictable (e.g., randomly selected) spreading codes and time jitter conceals cyclic features of the multitone modulation and prevents spoofing by sophisticated adversaries. The spreading code, time jitter, and (in multihop-capable instantiations) intended receiver(s) for each transmitter can be randomly selected for each slot, thereby preventing an adversary from learning or spoofing those transmission characteristics. Furthermore, disclosed systems and methods can be implemented using UDP formats that require no feedback from the receiver, thereby preventing links from being disrupted using cognitive jamming methods.

Figure 6:
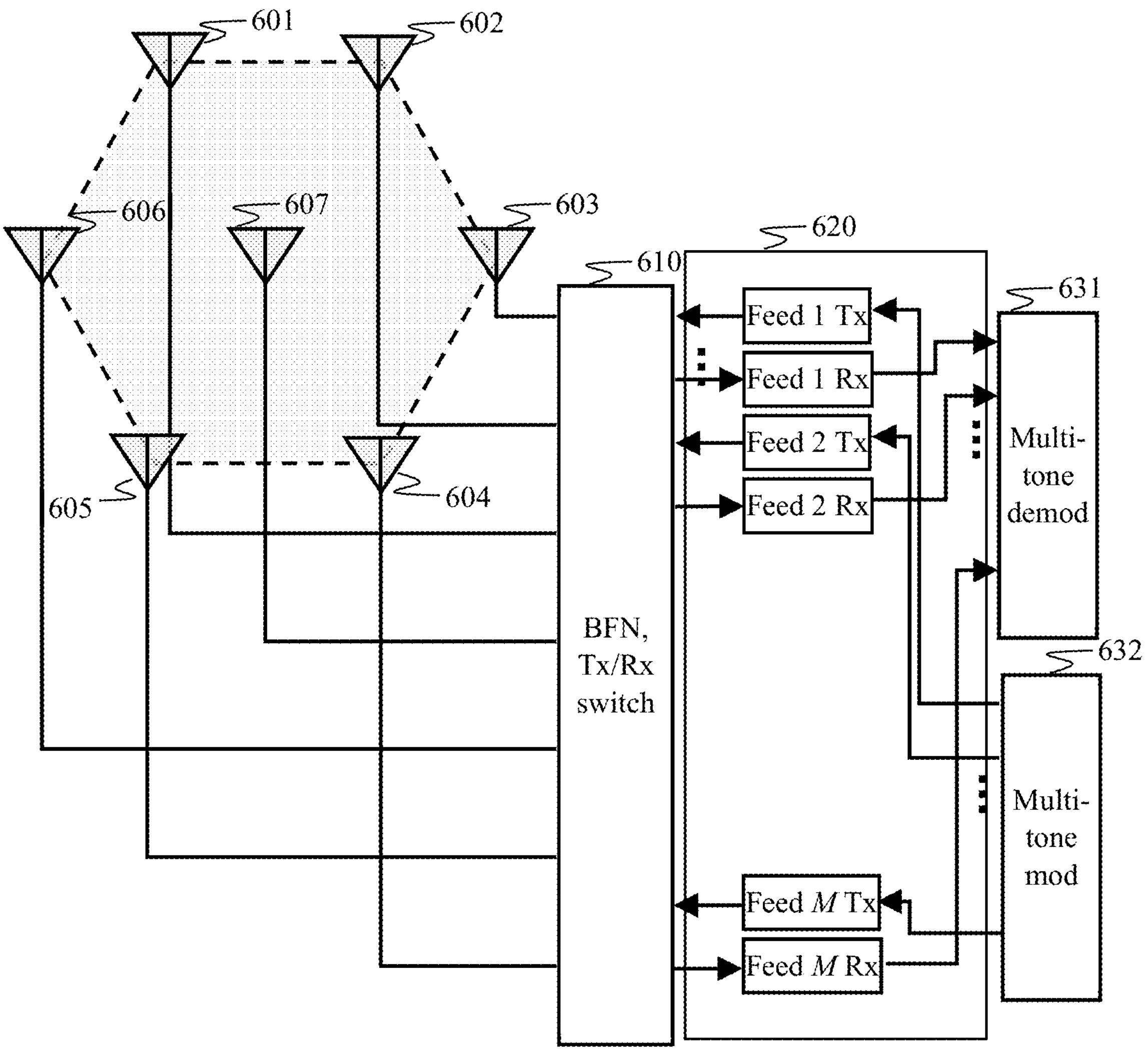
FIG. 6 illustrates a multifeed transceiver that can be implemented with aspects of the disclosure.

FIG. 6 illustrates a multifeed transceiver that can be implemented with aspects of the disclosure. Multiple antennas 601-607 are coupled to a beamforming network 610, which might include an array of transmit/receive switches for duplex operations. A feed network 620 provides communicative coupling between the beamforming network 610 and a dimensional multitone modem comprising a dimensional multitone demodulator 631 and a dimensional multitone modulator 632.

Some disclosed aspects configure a waveform that is highly resilient to second-order and higher-order cyclic detection methods. In addition to employing spreading formats (masked to prevent cyclic feature detection), an exemplary system might use multifeed receive arrays additional signal-to-noise ratio gain at the receiver, providing a reduction in interceptor-to-communicator pathloss ratio and circular equivalent vulnerability radius (CEVR) for an interceptor operating within the first Fresnel zone of the transmitter relative to the intercept footprint for a narrowband non-spread transmit signal. Multifeed transmit arrays can provide an additional reduction in transmit power via adaptive beamsteering algorithms implemented over multiple signal slots, i.e., with feedback from the receiver, providing for further reduction in CEVR. Over single slots, i.e., without feedback from the receiver, the system also provides a reduction in feature strength provided by interferometric detectors, e.g., linked detectors employing cross-correlation or cross-ambiguity function (CAF) methods to detect users on basis of time-difference-of-arrival (TDOA) or frequency-difference-of-arrival, using random spreading across transmit feeds.

Figure 7:
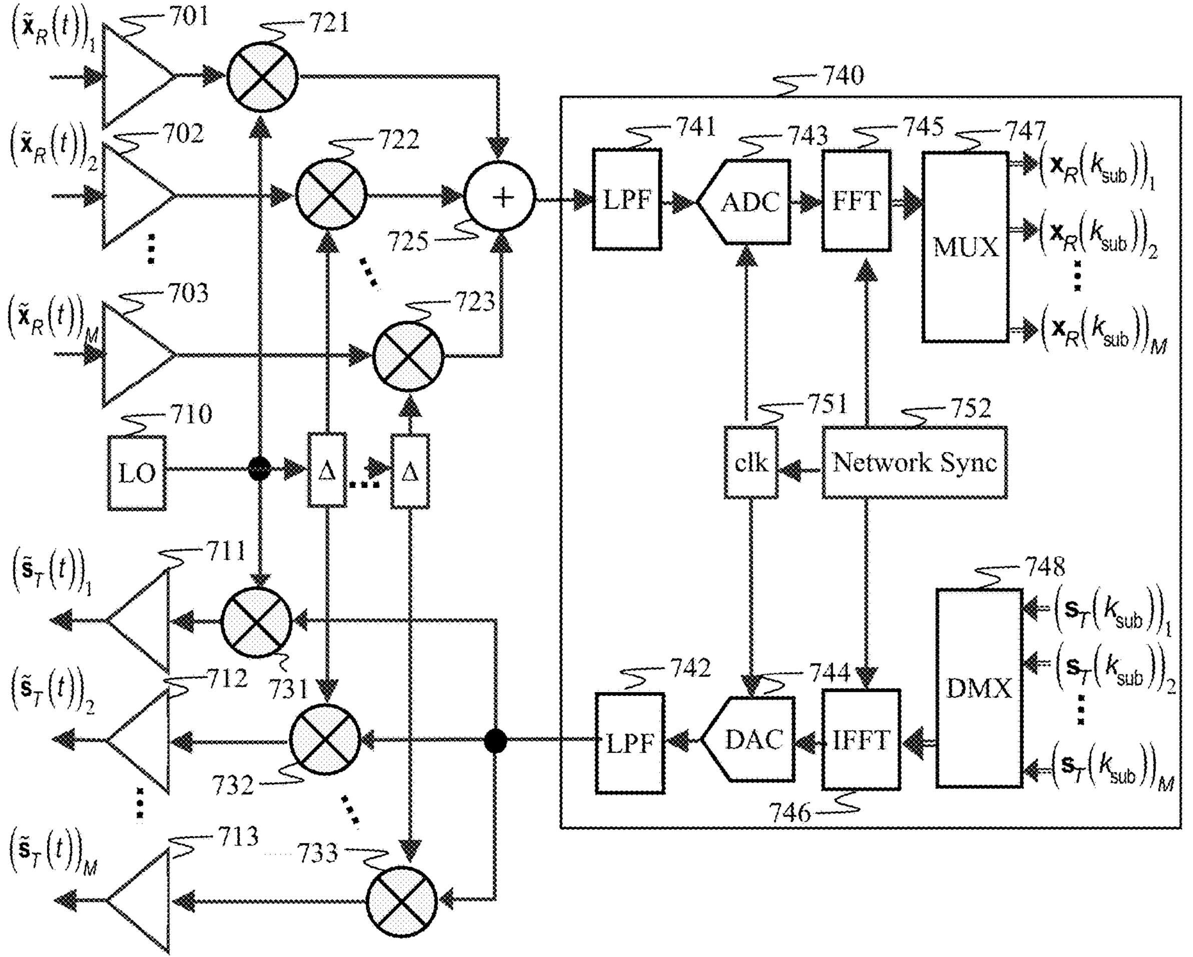
FIG. 7 illustrates a multifeed front end that can be implemented with aspects of the disclosure.

FIG. 7 illustrates a multifeed front end that can be implemented with aspects of the disclosure. In one example, received signals $(\tilde{A}_R(t))_1$ to $(\tilde{x}_R(t))_M$ collected from an antenna system are amplified with low-noise amplifiers 701-703, downconverted 721-723, combined 725, and coupled into a dimensional multitone modem 740. In one instance, a beamforming network comprises a local oscillator 710 and phase shifters (Δ). Baseband signals output from the dimensional multitone modem 740 are upconverted 731-733 and amplified (by power amplifiers) 711-713 to produce transmission signals $(\tilde{s}_T(t))_1$ to $(\tilde{s}_T(t))_M$.

Figure 8A:
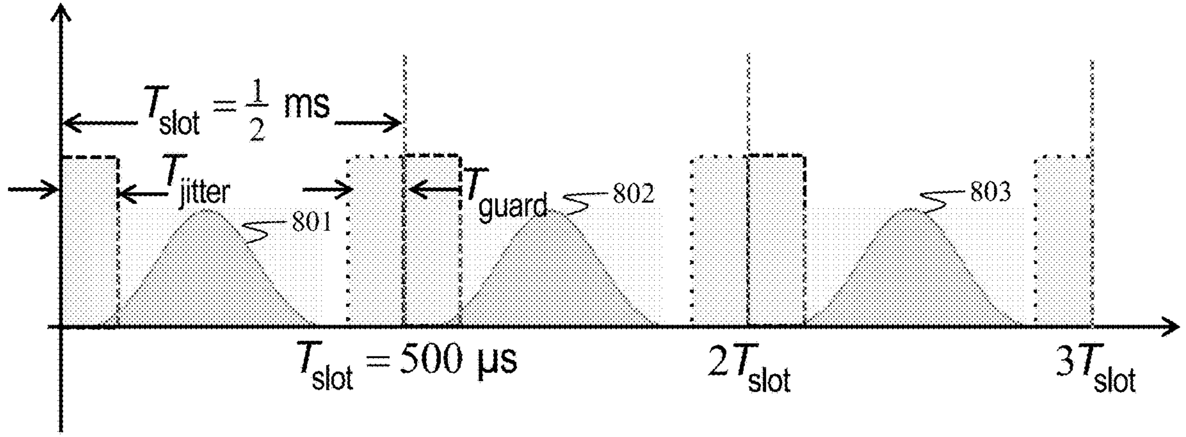
FIGS. 8A and 8B illustrate an exemplary time-slot and symbol configuration that can be implemented in some aspects, such as in transmitted signals when a random or pseudorandom jitter is used to jitter the clock timing offset or to add a phase-ramp to a multitone modulator.
Figure 8B:
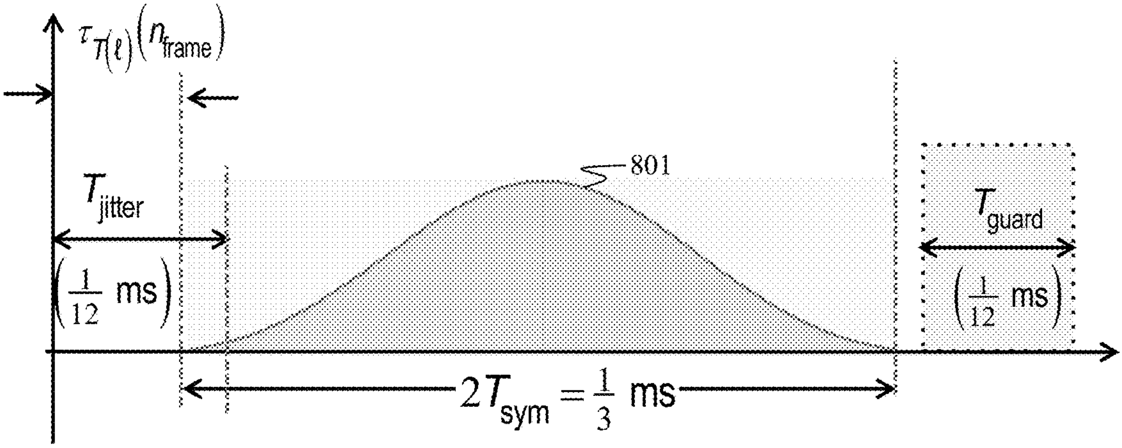

FIG. 8A illustrates an exemplary time-slot configuration that can be implemented in some aspects. Three slots with transmitted symbols 801-803 are depicted. Each slot has a duration ($T_{slot}$) of 0.5 ms. Within each slot is a duration $T_{jitter}$ during which time jitter is applied, and a guard interval $T_{guard}$. FIG. 8B illustrates a symbol 801 portion ($2T_{sym}$) with duration ⅓ ms, $T_{jitter}$=1/12 ms, and $T_{guard}$=1/12 ms.

FIGS. 9A-9B illustrate an exemplary SCSS technique that can be employed in some aspects of the disclosure. FIG. 9A illustrates a baseband cluster represented by data symbols $d_{T(l)}(0)$ to $d_{T(l)}(K_0-1)$ modulated onto subcarrier frequencies $f_0(0)$ to $f_0(K_0-1)$, wherein the subcarrier spacing is $f_{sym}=1/T_{sym}$. FIG. 9B depicts a spreading code $c_{T(l)}(0)$ to $c_{T(l)}(K_1-1)$ with sampling frequency $K_0 f_{sym}$, and spanning frequencies $f_1(0)$ to $f_1(K_1-1)$. The spreading code is configured to spread each baseband cluster. FIG. 9C depicts the resulting SCSS signal, comprising clusters 0 to $K_1-1$ and a total number $K_{sub}=K_0 \cdot K_1$ of subcarriers.

Figure 10:
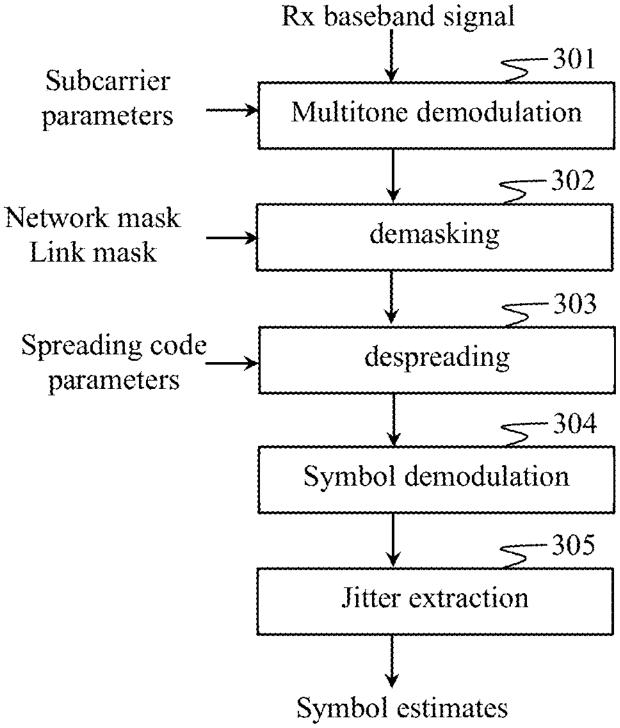
FIGS. 10-13 illustrate method and apparatus implementations of some of the disclosed aspects that can be implemented for receiving a multitone transmission signal.

FIG. 10 illustrates method and apparatus implementations of some of the disclosed aspects. At least some elements in the receiver implementations disclosed herein can be regarded as performing the reverse or complementary functions associated with transmitter method and apparatus implementations. A received multitone transmission signal is demodulated 301 into a plurality of subcarriers to produce a demodulated signal. Demodulation 301 might include equalization. Demodulation 301 might provide for channelizing the received signal(s). The demodulated signal is de-masked 302 by removing a network mask and a link mask (e.g., destination mask and/or source mask) from the demodulated signal to produce a demasked signal. The demasked signal is despread 303 to produce a despread signal. Despreading 303 can be configured to despread a signal comprising an inner spreading code and an outer spreading code.

In some aspects, symbols in the despread signal may be (optionally) demodulated 304 to produce demodulated symbols. Jitter in the demodulated symbols might be (optionally) extracted 305 to produce corrected demodulated symbols. If jitter was not added to the multitone transmission signal before transmission, jitter extraction 305 may not be necessary.

Figure 11:
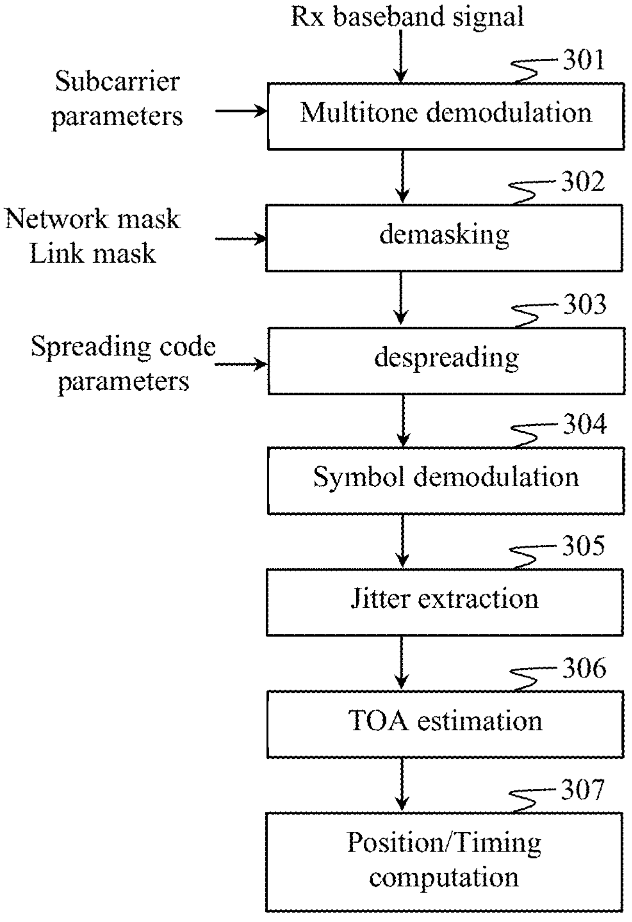

As shown in FIG. 11, method and apparatus implementations may further comprise estimating 306 a time-of-arrival (TOA) of the received multitone transmission signal from the corrected demodulated symbols. Method and apparatus implementations may further comprise computing 307 at least one of positioning and timing synchronization from the TOA.

At a receiver, a code nulling or Type C linear minimum-mean-square-error (LMMSE) algorithm that is not affected by the jitter might be used to detect and despread each baseband signal slot. Such algorithms might be used to compute the jittered TOA of each slot, i.e., the observed TOA of the signal, modulated by the jitter added to each slot. The jitter value can then be extracted from the baseband signal (such as shown in element 305 in FIGS. 10 and 11). In some aspects, such as when the TOA is used to compute a positioning/timing solution for the transmitter or receive (e.g., element 307 in FIG. 13), the jitter value might be used to remove jitter from the TOA estimate (e.g., in elements 305-306 in FIG. 13).

In some aspects, the disclosed system employs network synchronization strategies that both allow the network to be synchronized to a common time standard and allows relative positioning of network nodes to be determined by any other node in the network though sharing of TOA measurements between network users. If the spreading codes are shared between user nodes, the approach can also allow the development of both direction-of-arrival (DOA) and direction-of-transmission (DOT) between the user nodes, which can further determine orientation of the user-node antennas, and the line-of-bearing (LOB) between user nodes.

In one aspect, demodulating 301 is performed using a multifeed dimensional multitone modem communicatively coupled to at least one of a spatial-diverse antenna array or a polarization-diverse antenna array. In some aspects, demodulating 301 comprises computing despreading weights that enable data and time jitter to be extracted from the received multitone transmission signal. Demasking 302 can comprise performing QR Decomposition (QRD), e.g., using a Modified Gram-Schmidt Orthogonalization (MGSO) procedure, after removing a network mask from the demodulated signal. In some aspects, demasking 302 comprises performing algebraic code nulling to excise at least one of signals intended for at least one other receiver, interference, jamming signals, and spoofers. Despreading 303 can employ linear combining weights. In some aspects, despreading 303 removes Hadamard spreading within each cluster of subcarriers.

Figure 12:
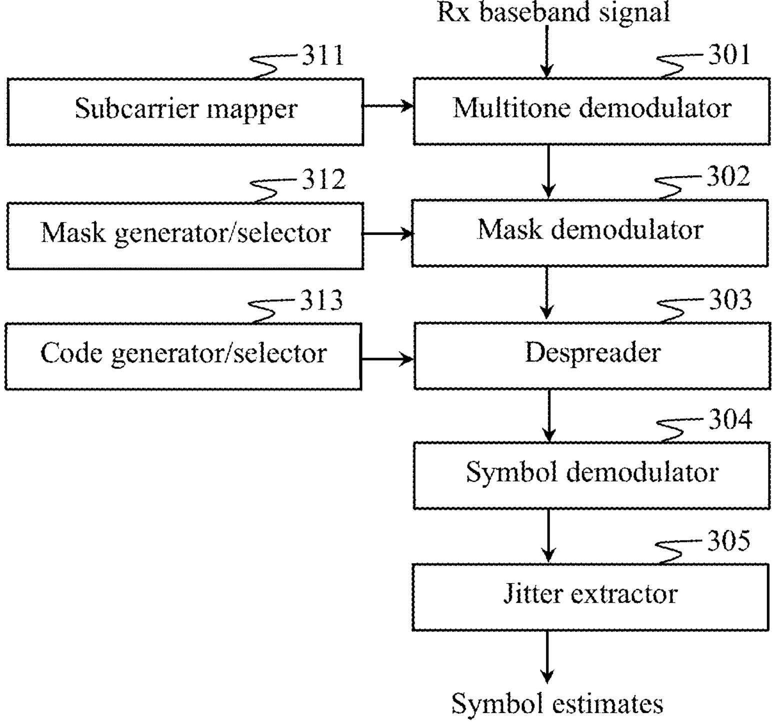

FIG. 12 illustrates method and apparatus implementations of some of the disclosed aspects. In addition to blocks (e.g., steps, components, functional elements) 301-305, a subcarrier mapper 311 (or configuring subcarrier mapping for multitone demodulation 301) can provide uplink and/or downlink signal parameters to the multitone demodulator 301. For example, such signal parameters might include physical resource blocks, bandwidth part, subcarriers, numerology, and/or other signal features scheduled for use by the receiver. The communication of such signal parameters to the demodulator 301 configures the demodulator 301 to demodulate the received baseband signal.

A mask generator and/or selector 312 (or configuring the mask demodulator 302) inputs masks or mask parameters to the mask demodulator 302, thereby configuring the mask demodulator 302 to demodulate frequency-domain symbols output from the multitone demodulation 301. The masks or mask parameters can correspond to network masks and/or link masks.

A code generator and/or selector 313 (or configuring the despreader 303) communicates spreading (e.g., despreading) codes or code parameters to the despreader 303, thereby configuring the despreader 303 to despread the demasked signals output from the mask demodulator 302. In some aspects, the code generator/selector 313 employs an adaptation algorithm (e.g., adaptive code nulling) to despread the outer spreading code(s) (e.g., SCSS or some other outer spreading code). The code generator/selector 313 can develop (e.g., compute) linear combining weights (or configure the despreader 303 to develop the weights) to remove the outer spreading code. The code generator/selector 313 can also configure the despreader 303 to remove the inner spreading code(s) (e.g., Hadamard spreading). The code generator/selector 313 might employ known (e.g., predetermined) Hadamard spreading codes.

Figure 13:
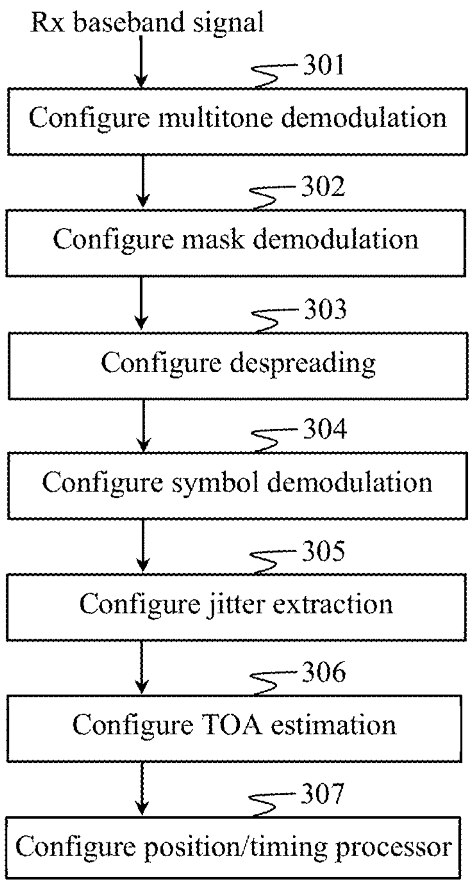

FIG. 13 illustrates method implementations of some of the disclosed aspects. At least some elements in the receiver implementations disclosed herein can be regarded as performing the reverse or complementary functions associated with transmitter method and apparatus implementations. Multitone demodulation is configured 301 to demodulate a received multitone transmission signal into a plurality of subcarriers to produce a demodulated signal. De-masking (e.g., mask demodulation) is configured 302 to de-mask the demodulated signal. De-spreading is configured 303 to despread the demasked signal to produce a despread signal. Symbol demodulation can be configured 304 to demodulate the despread signal to produce demodulated symbols. Jitter extraction can be configured 305 to extract jitter from the demodulated symbols to produce corrected demodulated symbols.

Disclosed aspects may optionally comprise configuring 306 an estimated TOA of the received multitone transmission signal from the corrected demodulated symbols. Disclosed aspects may optionally comprise configuring 307 at least one of positioning and timing synchronization from the TOA.

Figure 14:
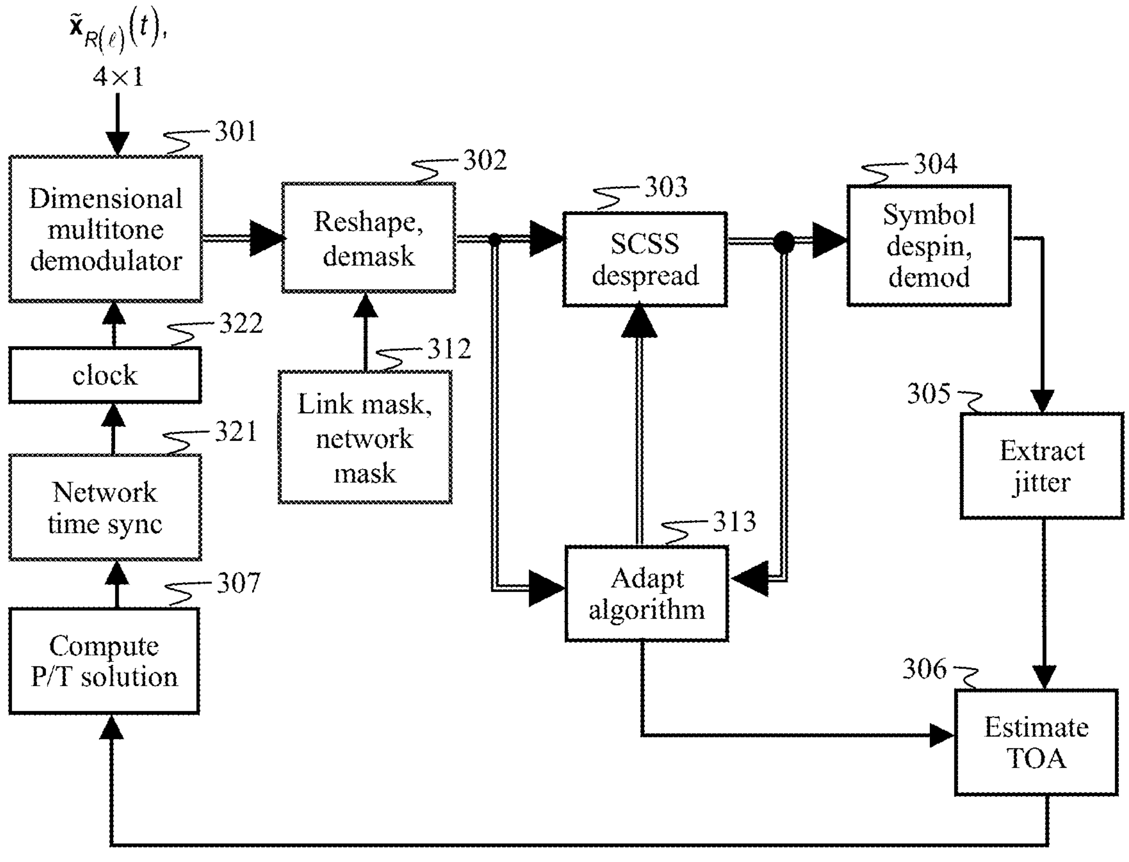
FIG. 14 is a block diagram of an exemplary four-feed demodulator, in accordance with some aspects of the disclosure.

FIG. 14 is a block diagram of an exemplary four-feed demodulator, in accordance with some aspects of the disclosure. A 4×1 received baseband signal $\tilde{x}_{R(l)}(t)$ corresponding to four receiver feeds is demodulated in a dimensional multitone demodulator 301 to produce a 3200×4 matrix $x_{R(l)}(n_{slot})$ corresponding to 3200 subcarriers and indexed by each time slot $n_{slot}$. The subcarrier values are reshaped and demasked 302 using transceiver and network masks produced by mask generator 312, to produce a 160×80 demasked signal matrix $x_{R(l)}(n_{slot})$. The demasked signal is despread 303 using an adaptation algorithm 313, which can be configured to blindly excise interference (including jamming and/or network signals intended for other users). Various techniques, including linear-algebraic code nulling, can be employed to compute linear-combining weights $W_{R(l)}(n_{slot})$. The despreader 303 output comprises a frame of symbols, $\hat{D}_{R(l)}(n_{frame})$, where symbols for each slot in the frame can be expressed by $$\hat{D}_{R(l)}(n_{slot})=[\hat{d}_{T(l')}(n_{slot})]_{l'\in T(l)}=x_{R(l)}(n_{slot})W_{R(l)}(n_{slot}).$$

Symbol despin and demodulation 304 is performed to produce data symbols and jitter estimates:

$$\{\hat{B}_{R(l)}(n_{frame}),\hat{\tau}_{R(l)}(n_{frame})\}$$

Jitter extraction 305 produces $$\{\hat{\tau}_{T(l')}(n_{frame})\}_{l'\in T(l)}$$

which is processed in TOA estimation 306 along with $\tilde{\tau}_{R(l)}(n_{frame})$ to produce $\{\hat{\tau}_{T(l')R(l)}\}_{l'\in T(l)}$. A position/timing (P/T) computation operates on $\{\tau_{T(l')R(l)}\}_{l'\in T(l)}$ and $\{\hat{\tau}_{T(l)R(l')}\}_{l'\in R(l)}$ to enable network time synchronization 321 and clocking 322 of the demodulator 301.

Figure 15:
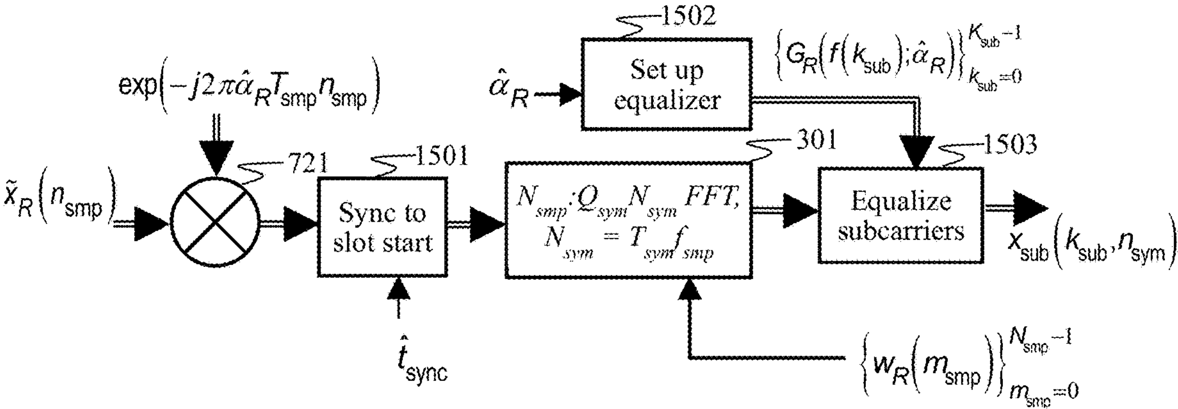
FIG. 15 is a block diagram of an exemplary channelization operation.
Figure 17:
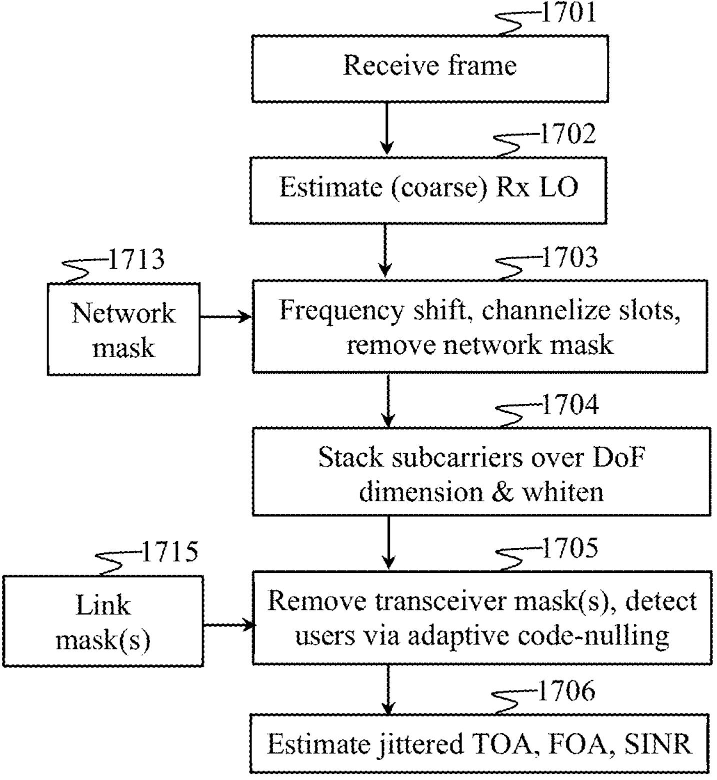
FIG. 17 illustrates an exemplary process that can be implemented according to some disclosed aspects.

FIG. 15 is a block diagram of a channelization operation. Samples $\tilde{x}_R(n_{smp})$ of a received signal are downconverted 721 with respect to a sampling frequency $T_{smp}$, the downconverted signal is synced to the slot start time, an FFT 301 is performed. The number of symbols $N_{sym}$ is the product of the symbol duration $T_{sym}$ multiplied by the sampling frequency $f_{smp}$. The FFT size (e.g., $N_{smp}$) is the number of symbols $N_{sym}$ multiplied by a sparsity factor $Q_{sym}$. The resulting subcarrier values are equalized 1503 (e.g., via equalizer weights produced in 1502) to produce equalized subcarrier values $x_{sub}(k_{sub}, n_{sym})$ for each symbol. The value $a_R$ is a frequency shift that is configured to remove a bulk frequency shift due to receiver LO offset. The receiver LO offset estimation is performed in block 1702 (in FIG. 17), and the frequency-shift and slot channelization operation is performed in block 1703 (FIG. 17).

Figure 16:
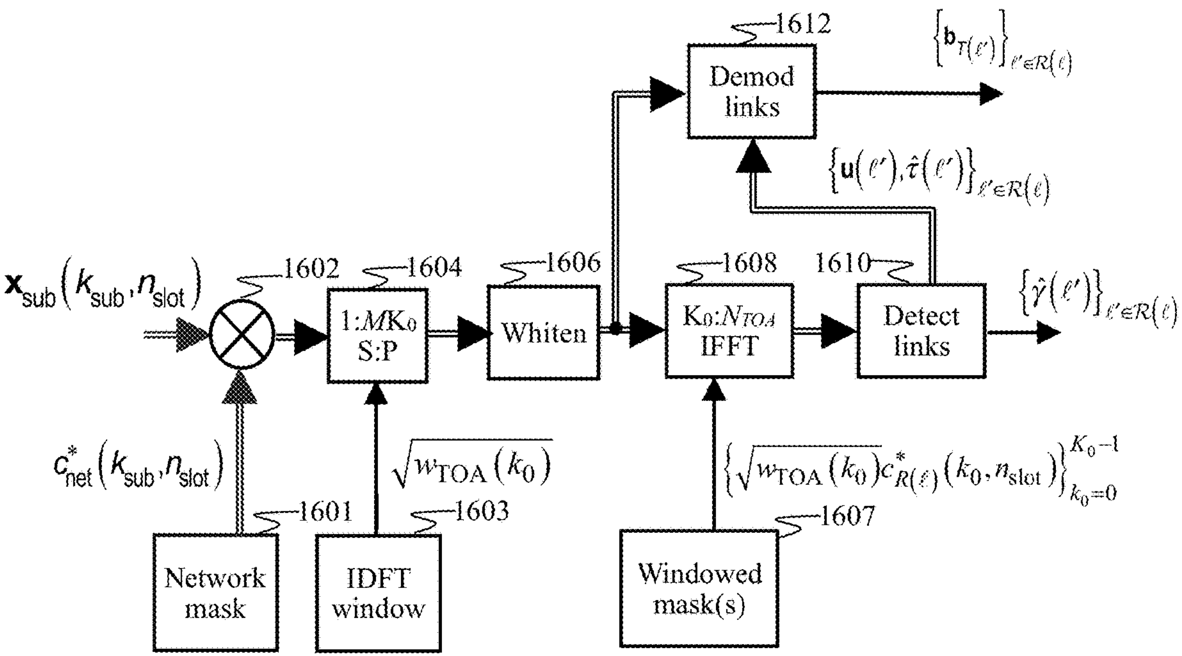
FIG. 16 is a block diagram of an exemplary code-nulling algorithm.

FIG. 16 is a block diagram of an exemplary code-nulling algorithm. Subcarrier vector $x_{sub}(k_{sub}, n_{slot})$ is demasked 1602 using at least one generated 1612 network mask $$c_{net}^{*}(k_{sub}, n_{slot}),$$

which reveals network-wide spectral redundancy. The demasked signal is serial-to-parallel converted 1604 into $MK_0$-length vectors, which are whitened 1606 (e.g., single QRD performed once per slot and amortized over all users). An inverse discrete Fourier transform (IDFT) window 1603 can provide inputs to the whitening 1604. At least one windowed destination mask $$\sqrt{w_{TOA}(k_0)}\,c_{R(l)}^{*}(k_0, n_{slot})$$

is generated 1607, which reveals transmitters communicating in the network. IFFT 1608, detection 1610, and demodulation 1612 operate to detect, separate, and extract link(s) corresponding to the destination mask, and excise links that do not have the destination mask(s). The demodulated link(s) can be expressed by $\{b_{T(l')}\}_{l' \in R(l)}$.

FIG. 17 illustrates a process that can be implemented according to disclosed aspects. A frame of a transmission is received 1701, and a coarse estimate of the receiver local oscillator can be performed 1702. A network mask is generated 1713 in a process 1703 that frequency-shifts, channelizes slots, and removes the network mask in the received signal. Subcarriers of the demasked signal are stacked over the signal's degrees-of-freedom dimension and whitened 1704. A generated 1715 link mask can be used to remove the link mask from the whitened signal and detect users via adaptive code-nulling 1705. An estimation step 1706 provides for estimating the jittered TOA, FOA, and SINR. Estimates in step 1705 can be used to improve the estimate of the receiver local oscillator.

Figures 18A, 18B:
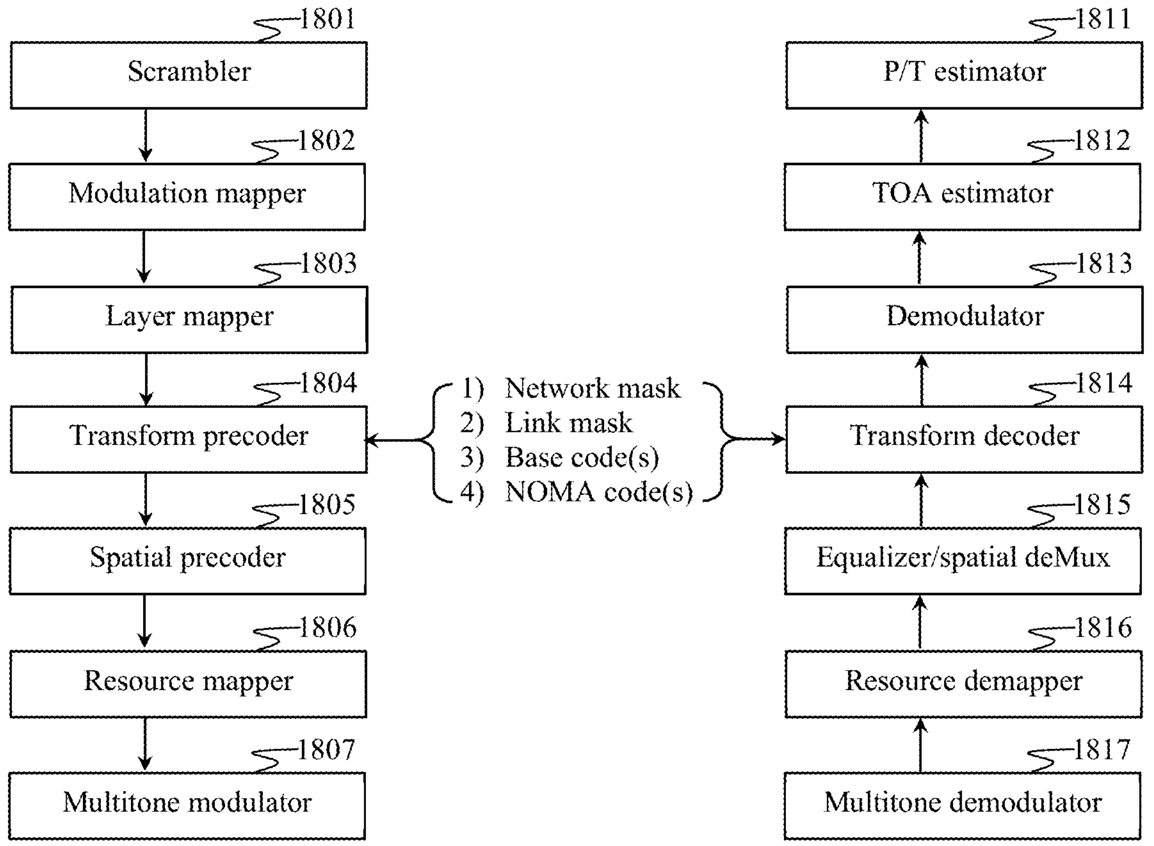
FIG. 18A illustrates an exemplary 5GNR transmitter configured according to some disclosed aspects.
FIG. 18B illustrates an exemplary corresponding 5GNR receiver.

As depicted in FIG. 18A, in a scrambler 1801, each $(q)^{th}$ codeword of bits $b^{(q)}$ is scrambled to produce scrambled bits $\tilde{b}^{(q')}$. In modulation mapping 1802, input scrambled bits $\tilde{b}^{(q')}$ are modulated to produce complex-valued modulation symbols $d^{(q)}(\ )$ as outputs. A layer mapper 1803 maps input complex-valued modulation symbols $$d^{(q)}(0), \ldots , d^{(q)}\left(M_{symb}^{(q)} - 1\right)$$

onto layers $x(i)=[x^{(0)}(i) \ldots x^{(L-1)}(i)]^T$, where $$i = 0, 1, \ldots , M_{symb}^{layer} - 1,$$

L is the number of layers, and $$M_{symb}^{layer}$$

is the number of modulation symbols per layer. Let $$N_d^{\mu}$$

be the total number of data symbols $x^{(\lambda)}$ in a block corresponding to layer $\lambda$ (where layer $\lambda=0, 1, \ldots, L-1$) before transform precoding 1804. In some instances, jitter $\tau_{T(l)}$ and/or one or more pilot symbols are multiplexed with the modulation symbols, such as before or after layer mapping, to produce the data symbols $d^{(q)}(i)$ or $x^{(\lambda)}(i)$.

If phase-tracking reference symbols are employed, the complex-valued symbols $$x^{(\lambda)}(0) \ldots x^{(\lambda)}\left(M_{symb}^{layer} - 1\right)$$

are mapped to complex-valued symbols $$\tilde{x}^{(\lambda)}\left(l \cdot N_d^{\lambda} + i'\right), \text{ where } i' = \{0, 1, \ldots , N_d^{\lambda}\}.$$

Otherwise, $\tilde{x}^{(\lambda)}(i)=x^{(\lambda)}(i)$.

Transform precoding 1804 converts a block of $$N_d^{\lambda}$$

data symbols $(\tilde{x}^{(\lambda)}(\bullet))$ into a block of $$M_{sc}^{PUSCH}$$

complex-valued symbols $(y^{(\lambda)}(\bullet))$, where $$M_{sc}^{PUSCH}$$

is the number of scheduled uplink subcarriers for a UE. Thus, $$N_d^{\lambda}$$

is the total number of data symbols in each OFDM symbol. In some instances, transform precoding might be performed in the downlink.

A block of complex-valued symbols $$\tilde{x}^{(\lambda)}(0), \ldots , \tilde{x}^{(\lambda)}\left(M_{symb}^{layer} - 1\right)$$

can be divided into $$M_{symb}^{layer} / N_d^{\lambda}$$

sets, each set corresponding to one OFDM symbol. The complex-valued symbols $\tilde{x}^{(\lambda)}$ include OFDM symbol values, and might include other symbols, such as control and/or reference symbols, including phase-tracking reference symbols.

Transform precoding 1804 can be represented by the following matrix product:

$$y^{(\lambda)}=P_T\tilde{x}^{(\lambda)}$$

where $y^{(\lambda)}$ is a $$M_{sc}^{PUSCH} \times 1$$

transform-precoded symbol vector, $P_T$ is a $$M_{sc}^{PUSCH} \times N_d^{\lambda}$$

transform-precoding matrix, and $\tilde{x}^{(\lambda)}$ is a $$N_d^{\lambda} \times 1$$

vector of the complex-valued symbols. Transform precoding 1804 can be implemented via any of various mathematical and/or computer algorithms.

In one example, the transform precoding 1804 operator $P_T$ can be configured to provision a combination of spreading and masking, such as expressed by:

$$y^{(\lambda)}=P_T\tilde{x}^{(\lambda)}=\mathrm{diag}\{c_{net}\}(G_{T(l)}\otimes(c_{R(l)}\circ(c_{base}\tilde{x}^{(\lambda)})))$$

where $c_{net}$ and $c_{R(l)}$ are the network mask and link mask, respectively; $c_{base}$ is a base spreading code (e.g., one of a set of orthogonal codes); and $G_{T(l)}$ represents spreading by a code that possibly belongs to a set of non-orthogonal codes.

In one example, transform precoding 1804 can be applied according to $$y^{(\lambda)}(l\cdot M_{sc}^{PUSCH}+k)=\frac{1}{\sqrt{N_d^{\lambda}}}\sum_{i=0}^{N_d^{\lambda}-1}\tilde{x}^{(\lambda)}(l\cdot N_d^{\lambda}+i)P_T(i,k)$$
$$k=0,\ldots,M_{sc}^{PUSCH}-1$$
$$l=0,\ldots,M_{symb}^{layer}/N_d^{\lambda}-1$$

resulting in a block of complex-valued symbols $$y^{(\lambda)}(0),\ldots,y^{(\lambda)}(M_{symb}^{layer}-1).$$

The variable $$M_{sc}^{PUSCH}=M_{RB}^{PUSCH}\cdot N_{sc}^{RB},\text{ where }M_{RB}^{PUSCH}$$

represents the bandwidth of the PUSCH in terms of resource blocks, $$N_{sc}^{RB}=12,\text{ and}$$
$$M_{RB}^{PUSCH}=2^{\alpha_2}\cdot 3^{\alpha_3}\cdot 5^{\alpha_5}\leq N_{RB}^{UL}$$

where $\alpha_2$, $\alpha_3$, $\alpha_5$ is a set of non-negative integers.

In some aspects, the block of vectors $[y^{(0)}(i),\ldots,y^{(L-1)}(i)]^T$ might be precoded 1805 with a spatial precoding matrix W to produce a block of complex-valued symbols $$z^{(p)}(0),\ldots,z^{(p-1)}(M_{symb}^{ap}-1)$$

mapped onto resource elements at antenna ports p $\{p_0,\ldots,p_{\rho-1}\}$. For transmission on a single antenna port, the precoding 1805 can be defined by $z^{(0)}(i)=y^{(0)}(i)$, where $$i=0,1,\ldots,M_{symb}^{ap}-1,\text{ and }M_{symb}^{ap}=M_{symb}^{layer}.$$

Precoding 1805 for spatial multiplexing is defined by:

$$\begin{bmatrix}z^{(0)}(i)\\ \vdots\\ z^{(P-1)}(i)\end{bmatrix}=W\begin{bmatrix}y^{(0)}(i)\\ \vdots\\ y^{(v-1)}(i)\end{bmatrix}$$

where the precoding matrix W is P×L, $$i=0,1,\ldots,M_{symb}^{ap}-1,\text{ and }M_{symb}^{ap}=M_{symb}^{layer}.$$

For non-codebook-based transmission, the precoding matrix W might equal the identity matrix.

The block of complex-valued symbols $$z^{(p)}(0),\ldots,z^{(p)}(M_{symb}^{ap}-1)$$

is multiplied with an amplitude-scaling factor and mapped 1806 in sequence to resource elements $(k', l)_{p,q}$ in the virtual resource blocks assigned for transmission (e.g., allocated for PUSCH or another channel(s)). Virtual resource blocks can be mapped 1806 to physical resource blocks according to non-interleaved mapping, for example.

In one instance, a time-continuous signal $$s_l^{(p,\mu)}(t)$$

generated 1807 on antenna port p and subcarrier spacing (SCS) configuration μ for an $l^{th}$ OFDM symbol is expressed by:

$$s_l^{(p,\mu)}(t)=\sum_{k=0}^{N_{grid}^{size,\mu}N_{sc}^{RB}-1}a_{k,l}^{(p,\mu)}\cdot e^{j2\pi\left(k+k_0^{\mu}-N_{grid}^{size,\mu}N_{sc}^{RB}/2\right)f_s\left(t-N_{CP,l}^{\mu}T_c-t_{start,l}^{\mu}\right)}$$
$$k_0^{\mu}=\left(N_{grid,x}^{start,\mu}+\frac{N_{grid,x}^{size,\mu}}{2}\right)-\left(N_{grid,x}^{start,\mu_0}+\frac{N_{grid,x}^{size,\mu_0}}{2}\right)N_{sc}^{RB}2^{\mu_0-\mu}$$

where $$t_{start,l}^{\mu}\leq t<t_{start,l}^{\mu}+\left(N_u^{\mu}+N_{CP,l}^{\mu}\right)T_c$$

is the time within the subframe, $$N_u^{\mu}=2048\kappa\cdot 2^{-\mu},\ f_s=2^{\mu}\cdot 15[\mathrm{kHz}],\ \mu=0,1,2,3,4$$

(μ denotes SCS, i.e. numerology), and $$a_{k,l}^{(p,\mu)}$$

comprises values of the complex-valued symbols, $$y^{(\lambda)}(l\cdot N_d^{\lambda}+k).$$

FIG. 18B illustrates functional aspects of a receiver which can comprise reversing at least some of the functional aspects of the transmitter shown in FIG. 18A. A multitone demodulator 1817 operates on received multitone signals from one or more antenna ports to channelize the signals.

Channelization can comprise functions of the resource demapper 1816, which outputs data symbols corresponding to one or more data streams (e.g., channels). The data can be equalized 1815 and/or spatial demultiplexed.

A transform decoder 1814 can provide for at least demasking (e.g., 302) and despreading (e.g., 303). In one example, the transform decoder 1814 can employ an adapt algorithm to separate and despread NOMA signals, and excise interference. Demodulator 1813 can provide for symbol despin and demodulation (e.g., 304), possibly jitter extraction (e.g., 305), and may be configured to perform descrambling and/or error detection/correction. TOA estimation 1812 (e.g., 306) may be provided. In some aspects, a P/T solution may be computed (e.g., 307).

In accordance with some disclosed P2P aspects, a transmitter desiring to send a data packet to a target receiver can spread the data packet over a set of subcarriers known to the receiver, using a receive symbol mask that is known to the receiver, and using an unpredictable transmit spreading code. The receiver can use a max-SINR code-nulling method to detect the transmitter, and to extract the data packet from the background noise and interference. In some aspects, unpredictable transmit codes can be applied over space/polarization only. This can allow the approach to be employed without SCSS.

In accordance with some disclosed MP2P aspects, each transmitter desiring to send a data packet to a receiver can spread its data packet over a common set of subcarriers known to the receiver, using a receive symbol mask that is known to the receiver, and using an unpredictable transmit spreading code. The receiver can use a max-SINR code-nulling method to detect all of the transmitters, and to extract the data packets (sent by the transmitters) from the background noise and interference. In some aspects, unpredictable transmit codes can be applied over space/polarization only. This can allow the approach to be employed without SCSS.

In accordance with some disclosed P2MP aspects, a transmitter desiring to send distinct data packets to multiple target receivers can spread each data packet over non-overlapping subcarrier sets known to the target receivers, using separate receive symbol masks that are known to each of the target receivers, and using an unpredictable transmit spreading code on each subset of nonoverlapping subcarrier sets. Thus, the signals intended for each of the target receivers are orthogonal to each other at each target receiver. Each target receiver can use a max-SINR code-nulling method to detect the transmitter, and to extract the data packet meant for that receiver from background noise and interference. Because the signal(s) intended for the other receivers are orthogonal to each receiver, they are nulled during the despreading process.

In one aspect, a transmitter desiring to send a common data packet to multiple receivers can spread that data packet over all of the subcarriers, and using a common symbol mask that is also known to all of the receivers. This can be used, for example, to advertise a new transmitter's presence in the network, such as for network entry purposes. It is possible that unpredictable transmit codes might be applied over space/polarization only.

In one aspect of a P2MP approach, the power level on each subcarrier is kept constant, regardless of range to the receivers. This can prevent an adversary from identifying P2MP operation, identifying frequency subsets used for P2MP operation, or identifying transmitters based on disparate power levels over subsets of subcarriers.

In some aspects, the subcarrier subsets might be unpredictably chosen. The receive code-nulling algorithm is nevertheless able to detect the signal(s) intended for the receiver. Disclosed aspects herein can adapt P2MP to multi-point-to-multi-point network topologies.

FIG. 19A-19D show functional aspects of the disclosure configured to be employed in a 5GNR system. In one example, no jitter is employed, and the SC-FDMA waveform is used, as described in Section 5.6, *SC-FDMA Baseband Signal Generation,* 3GPP TS 136.211 V9.1.0 (2010-04, Release 9), the entire reference of which is incorporated by reference. In one instance, an uplink grant might comprise 4 Physical Resource Blocks (PRB's) scheduled over 6 consecutive SC-FDMA symbols (for a total of 24 PRBs), which provides for 48 subcarrier symbols in each of the 6 SC-FDMA symbols for a total of 288 symbols.

A first spreader 1901 is configured to perform a first spreading function with a spreading code length equal to the total of 288 symbols. This can be referred to as an inner code. In this example, the first spreader 1902 employs a 288×1 spreading code vector that spreads a baseband data signal comprising 288 symbols or any integer subset of 288 symbols. The number of symbols spread by the first spreading function 1901 can be selected to provide for a predetermined latency performance. For example, in a low-latency application, 288 data symbols are input to the first spreader 1901 for spreading by the 288×1 vector. In an IoT application, a small number (<<288) of symbols might be spread 1901 by the 288×1 vector. The output of the first spreader 1901 is a 288×1 spread data vector.

A mask function 1902 is configured to perform element-wise multiplication of the spread data vector with a link mask and a transmit mask. In this example, the mask function 1902 employs a 288×1 link mask and a 288×1 network mask, generating a 288×1 masked data signal.

A second spreader 1903 is configured to spread the masked data signal over scheduled uplink PRBs using a second spreading code, which is unpredictably and uniquely determined by the transmitter(s). This can be referred to as an outer code. For P2P and MP2P network connections, where a transmitter is sending a signal to a single receiver in each subslot, the masked signal (e.g., the 288×1 masked data signal) can be spread 1903 (using a length-24 spreading code) over the total number of PRBs (e.g., 24 PRBs), resulting in a 24·288×1 second spread data vector.

For P2MP network connections, as shown in FIG. 19B, in which a transmitter sends a signal to N different receivers, the first spreader 1901 can generate N 288×1 spread data vectors, i.e., one data vector for each desired receiver. The mask 1902 can multiply each of the N spread data vectors by a different 288×1 link mask and by the 288×1 common network mask, and map the masked data to a unique, nonoverlapping subset of PRB's for each signal, e.g., 24/N PRB's. The second spreader 1903 can spread each masked data signal by a second length-24/N code, unpredictably and uniquely determined at the transmitter.

The second spread data is mapped to PRBs and modulated by SC-FDMA modulator 1904 to produce at least one discrete-time signal. A transmitter 1905 can comprise one or more transmitter feeds. As shown in FIG. 19C, for MP2P and P2P network connections having M transmitter feeds 1905, the second spreading 1903 is performed over 24 PRB's using a length-24M spreading code that is unpredictably and uniquely determined at each transmitter. As shown in FIG. 19D, for P2MP network connections having M transmitter feeds 1905, the second spreading 1903 is performed over 24/N PRB's using a length-24M/N spreading code, unpredictably and uniquely determined at each transmitter.

In one example, a scheduled uplink channel might be 96 6×12 SC-FDMA PRB's (i.e., there are 96 groups of 12 PRBs scheduled in each of six SC-FDMA symbols, so the SC-FDMA signal spans 6 time symbols and comprises 1,152 subcarriers. A $K_0 \times 1$ inner code (first spreading 1901) and a $K_1 \times 1$ outer code (second spreading) are provided wherein $K_0 \cdot K_1 = 1{,}152$. In one instance, $K_0=24$ and $K_1=48$. Spreading 1901 and 1903 can comprise provisioning each transceiver with a library comprising a number $N_0$ of $K_0 \times 1$ codes and a number $N_1$ of $K_1 \times 1$ codes, wherein each code is configured to provide a signal with low output PAPR and low maximum cross-correlation. In some aspects, each transmitter can be provisioned with a unique cyclic phase shift.

In one aspect, each receiver might be assigned a specific outer code, or specific subset of outer codes. Over each ½-ms slot, the transmitter transmits a 6-symbol baseband signal (e.g., 8 information bits, with QPSK modulation and rate 2/3 coding) using an unpredictably-selected inner code, and an outer code that is in the subset of codes assigned to a target receiver, multiplied by a cyclic phase shift that is assigned to the transmitter, or is unpredictably determined by the transmitter. In other aspects, different techniques can be used to uniquely identify a particular transmitter.

In yet another aspect, each receiver might be assigned a specific inner code, or a specific subset of inner codes, and each transmitter uses an unpredictably-selected outer code. In instances in which the transmitter employs a multifeed transceiver, transmitters may employ an unpredictably-determined transmit code multiplied by an unpredictably-determined constant-modulus gain on each antenna.

Disclosed aspects can be configured for any of the various 5GNR numerologies. One example might employ 60 kHz subcarrier spacing, providing a 50/3 μs base SC-FDMA symbol s(t). If this base symbol s(t) is repeated 5 times (with an alternating sign for each symbol), this produces an extended symbol with a 250/3 μs duration, expressed as:

$$[+s(t)-s(t)+s(t)-s(t)+s(t)],$$

This can be regarded as a 50 μs base symbol (center three iterations) with a ±50/3 μs cyclic buffer. This structure can provide flexibility for cyclic jitter within the extended symbol, and for loose synchronization with UTC.

If the signal is transmitted over 288 subcarriers and a ½ ms (6 extended symbol) slot, e.g., 24 6×12 "extended PRB's," where a PRB now covers 720 kHz, spreading 1901 generates a 72-symbol first spread data signal, which will map to a 6×12 extended PRB, and a receive and network mask are added 1902 to the first spread data signal. Second spreading 1903 provides spreading over the 24 extended PRB's using a length-24M transmit code, unpredictably determined at the transmitter, or (for MP2P transmission) N 24M/N codes over N subsets of PRB's. Alternatively, the number (288) of subcarriers is used to provide a set of $K_0 \times 1$ inner codes and a set of $K_1 \times 1$ outer codes (e.g., $K_0=16$ and $K_1=18$). These spreading codes may then be applied using a 6-symbol baseband signal, as previously described.

Figure 20:
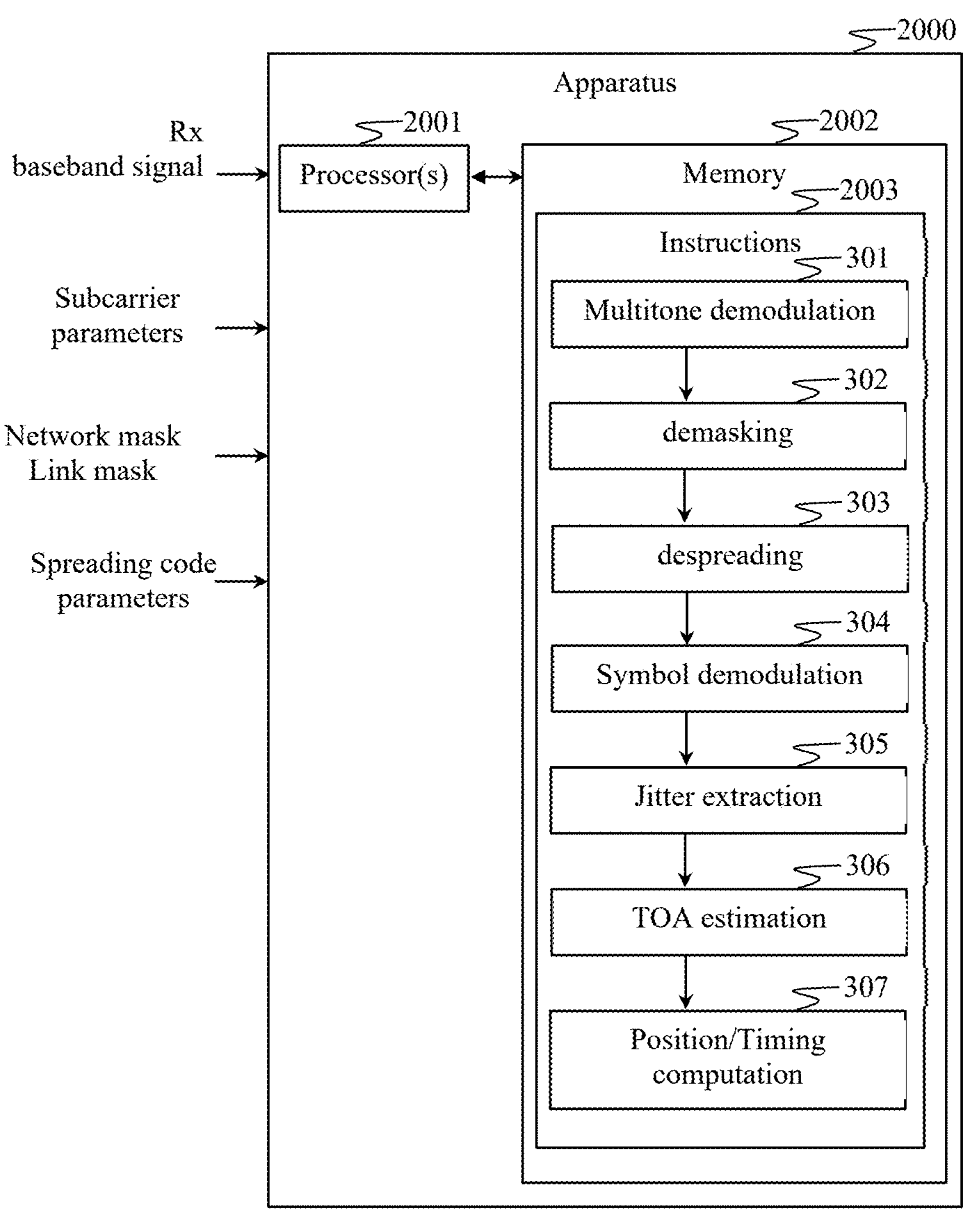
FIG. 20 illustrates an apparatus 2000 comprising one or more processors 2001, memory 2002, and instructions 2003 stored in the memory 2002, the instructions 2003 configured to instruct the processor(s) 2001 to process a received multitone transmission signal.

FIG. 20 illustrates an apparatus 2000 comprising one or more processors 2001, a memory 2002, and instructions 2003 stored in the memory 2002, the instructions 2003 configured to instruct the processor(s) 2001 to process a received multitone transmission signal by a multitone demodulation step 301, a demasking step 302, a despreading step 303, a symbol demodulation step 304, a jitter extraction step 305, a TOA estimation step 306, and a position/timing computation step 307.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, ¶6, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray RTM. disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications. changes and variations may be made in the arrangement. operation and details of the methods and apparatus described above without departing from the scope of the claims.

The invention claimed is:

1. A method, comprising:

demodulating a received multitone transmission to produce at least one demodulated signal;

demasking the at least one demodulated signal, by removing at least one link mask, to produce at least one demasked signal; and despreading the at least one demasked signal, wherein the at least one demasked signal comprises an inner spreading code and an outer spreading code, and an adaptation algorithm removes the outer spreading code.

2. The method of claim 1, wherein the inner code comprises a length-N spreading code, wherein L is a plurality of clusters, and N is a plurality of subcarrier frequencies in each of the plurality L of clusters; the outer spreading code comprises a length-L spreading code; and the received multitone transmission comprises N·L subcarriers in one or more physical resource blocks.

3. The method of claim 1, wherein the adaptation algorithm computes linear combining weights to provide for linear-algebraic code nulling.

4. The method of claim 1, wherein the received multitone transmission is a fifth generation new radio (5GNR) signal, and demodulating the 5GNR signal.

5. The method of claim 1, further comprising demodulating at least one despread signal produced by the despreading to produce demodulated symbols.

6. The method of claim 1, wherein:

the demasking comprises removing a source mask or a destination mask;

the demasking further comprises removing a network mask;

the demasking further comprises separating multiple signals in the at least one demodulated signal, each one of the multiple signals having a different source mask;

the demasking further comprises performing algebraic code nulling to excise at least one of signals intended for at least one ether-receiver, interference, jamming signals, or spoofers;

the demasking further comprises deducing at least one transmitter's identity from at least one source mask; or the demasking whitens the at least one demodulated signal to produce a whitened signal, followed by removing the at least one link mask from the whitened signal.

7. The method of claim 1, further comprising estimating a time-of-arrival (TOA) of the received multitone transmission from demodulated symbols produced by demodulating at least one despread signal or from corrected demodulated symbols produced by extracting jitter from the demodulated symbols.

8. The method of claim 1, further comprising computing at least one of positioning and timing synchronization from a time-of-arrival (TOA) of the received multitone transmission.

9. The method of claim 1, wherein the demodulating is performed using a multifeed dimensional multitone modem communicatively coupled to at least one of a spatial-diverse antenna array or a polarization-diverse antenna array.

10. An apparatus, comprising:

one or more processors;

a memory in electronic communication with the one or more processors; and instructions stored in the memory and executed by the one or more processors to cause the apparatus to:

demodulate a received multitone transmission to produce at least one demodulated signal;

demask the at least one demodulated signal, by removing at least one link mask, to produce at least one demasked signal; and despread the at least one demasked signal, wherein the at least one demasked signal comprises an inner spreading code and an outer spreading code, and the at least one demasked signal is despread by an adaptation algorithm configured to remove the outer spreading code.

11. The apparatus of claim 10, wherein the inner spreading code comprises a length-N spreading code, wherein L is a plurality of clusters, and N is a plurality of subcarrier frequencies in each of the plurality L of clusters; the outer spreading code comprises a length-L spreading code; and the received multitone transmission comprises N·L subcarriers in one or more physical resource blocks.

12. The apparatus of claim 10, wherein the adaptation algorithm computes linear combining weights to provide for linear-algebraic code nulling.

13. The apparatus of claim 10, wherein the received multitone transmission is a fifth generation new radio (5GNR) signal, and the instructions stored in the memory and executed by the one or more processors to cause the apparatus to demodulate the received multitone transmission is configured to demodulate the 5GNR signal.

14. The apparatus of claim 10, further comprising instructions stored in the memory and executed by the one or more processors to cause the apparatus to demodulate at least one despread signal after the at least one demasked signal is despread, to produce demodulated symbols.

15. The apparatus of claim 10, further comprising instructions stored in the memory and executed by the one or more processors to cause the apparatus to estimate a time-of-arrival (TOA) of the received multitone transmission from demodulated symbols produced by demodulating at least one despread signal or from corrected demodulated symbols produced by extracting jitter from the demodulated symbols.

16. The apparatus of claim 10, further comprising instructions stored in the memory and executed by the one or more processors to cause the apparatus to compute at least one of positioning and timing synchronization from a time-of-arrival (TOA) of the received multitone transmission.

17. The apparatus of claim 10, wherein the instructions stored in the memory and executed by the one or more processors to cause the apparatus to demodulate the received multitone transmission is configured to use a multifeed dimensional multitone modem communicatively coupled to at least one of a spatial-diverse antenna array or a polarization-diverse antenna array.

18. The apparatus of claim 10, wherein:

the instructions stored in the memory and executed by the one or more processors provide for removing a source mask or a destination mask;

the instructions stored in the memory and executed by the one or more processors provide for removing a network mask;

the instructions stored in the memory and executed by the one or more processors provide for separating multiple signals in the at least one demodulated signal, each one of the multiple signals having a different source mask;

the instructions stored in the memory and executed by the one or more processors provide for performing algebraic code nulling to excise at least one of signals intended for at least one receiver, interference, jamming signals, or spoofers;

the instructions stored in the memory and executed by the one or more processors provide for deducing at least one transmitter's identity from the source mask; or the instructions stored in the memory and executed by the one or more processors to demask are configured to whiten the at least one demodulated signal to produce a whitened signal, followed by removing the at least one link mask from the whitened signal.

* * * * *